(12) United States Patent
Wu et al.

(10) Patent No.: US 10,264,003 B1
(45) Date of Patent: Apr. 16, 2019

(54) ADAPTIVE NETWORK MONITORING WITH TUNEABLE ELASTIC GRANULARITY

(71) Applicant: ExtraHop Networks, Inc., Seattle, WA (US)

(72) Inventors: Xue Jun Wu, Seattle, WA (US); Nicholas Jordan Braun, Seattle, WA (US); Joel Benjamin Deaguero, Seattle, WA (US); Michael Kerber Krause Montague, Lake Forest Park, WA (US); Bhushan Prasad Khanal, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 15/891,311

(22) Filed: Feb. 7, 2018

(51) Int. Cl.
*H01L 29/06* (2006.01)
*G06N 20/00* (2019.01)
*H04L 29/06* (2006.01)

(52) U.S. Cl.
CPC ......... *H04L 63/1416* (2013.01); *G06N 20/00* (2019.01)

(58) Field of Classification Search
CPC . H04L 63/1408; H04L 63/1416; H04L 67/22; H04L 67/1023; H04L 67/1006; H04L 67/1008; H04L 43/00; H04L 43/08; H04L 43/16; H04L 41/0896; H04L 29/08153; H04L 29/08234; H04L 12/14; G06N 9/50; G06N 99/005
See application file for complete search history.

(56) References Cited

U.S. PATENT DOCUMENTS

| | | |
|---|---|---|
| 5,027,269 A | 6/1991 | Grant |
| 5,430,727 A | 7/1995 | Callon |
| 5,541,995 A | 7/1996 | Normile et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |

(Continued)

OTHER PUBLICATIONS

Official Communication for U.S. Appl. No. 12/326,672 dated Jun. 9, 2010 (9 pages).

(Continued)

*Primary Examiner* — Nelson Giddins
(74) *Attorney, Agent, or Firm* — John W. Branch; Lowe Graham Jones PLLC

(57) ABSTRACT

Embodiments are directed to monitoring network traffic using network computers. Monitoring triggers associated with one or more conditions and one or more actions may be provided. A monitoring engine may monitor information that is associated with network traffic associated with networks based on an inspection detail level. The monitoring engine may compare the monitored information to the conditions associated with the monitoring triggers. The monitoring engine may activate one or more monitoring triggers based on a result of the comparison. The monitoring engine may modify the inspection detail level based on the actions associated with the activated monitoring triggers to increase the amount of the information monitored by the monitoring engine. An analysis engine may provide analysis of the network traffic based on the monitored information.

30 Claims, 10 Drawing Sheets

(56) References Cited

U.S. PATENT DOCUMENTS

| | | |
|---|---|---|
| 5,928,363 A | 7/1999 | Ruvolo |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,999,729 B2 | 2/2006 | Wandel |
| 7,042,888 B2 | 5/2006 | Berggreen |
| 7,089,326 B2 | 8/2006 | Boucher et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,474,654 B2 | 1/2009 | Guru |
| 7,480,292 B2 | 1/2009 | Busi et al. |
| 7,535,906 B2 | 5/2009 | Engbersen et al. |
| 7,545,499 B2 | 6/2009 | Overbeck et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,774,456 B1 | 8/2010 | Lownsbrough et al. |
| 7,864,764 B1 | 1/2011 | Ma et al. |
| 7,916,652 B1 | 3/2011 | Lima et al. |
| 7,979,555 B2 | 7/2011 | Rothstein et al. |
| 8,040,798 B2 | 10/2011 | Chandra et al. |
| 8,079,083 B1 * | 12/2011 | Bennett ............... H04L 63/1416 726/23 |
| 8,125,908 B2 | 2/2012 | Rothstein et al. |
| 8,185,953 B2 | 5/2012 | Rothstein et al. |
| 8,411,677 B1 | 4/2013 | Colloff |
| 8,619,579 B1 | 12/2013 | Rothstein et al. |
| 9,191,400 B1 * | 11/2015 | Ptasinski ............ H04L 63/1416 |
| 9,426,036 B1 | 8/2016 | Roy |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0107953 A1 | 8/2002 | Ontiveros et al. |
| 2002/0133586 A1 | 9/2002 | Shanklin et al. |
| 2002/0152209 A1 | 10/2002 | Merugu et al. |
| 2003/0093514 A1 | 5/2003 | Valdes et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0233361 A1 | 12/2003 | Cady |
| 2004/0003094 A1 | 1/2004 | See |
| 2004/0047325 A1 | 3/2004 | Hameleers et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0125553 A1 | 6/2005 | Wu et al. |
| 2005/0182833 A1 | 8/2005 | Duffie et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0106743 A1 | 5/2006 | Horvitz et al. |
| 2006/0123477 A1 | 6/2006 | Raghavan et al. |
| 2006/0174343 A1 | 8/2006 | Duthie et al. |
| 2006/0184535 A1 | 8/2006 | Kaluskar et al. |
| 2006/0230456 A1 | 10/2006 | Nagabhushan et al. |
| 2007/0039051 A1 | 2/2007 | Duthie et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0192863 A1 | 8/2007 | Kapoor et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas |
| 2008/0069002 A1 | 3/2008 | Savoor et al. |
| 2008/0130659 A1 | 6/2008 | Polland |
| 2008/0141275 A1 | 6/2008 | Borgendale et al. |
| 2008/0147818 A1 | 6/2008 | Sabo |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2009/0010259 A1 | 1/2009 | Sirotkin |
| 2009/0034426 A1 | 2/2009 | Luft et al. |
| 2009/0168657 A1 | 7/2009 | Puri et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0292954 A1 | 11/2009 | Jiang et al. |
| 2009/0296593 A1 | 12/2009 | Prescott |
| 2010/0091770 A1 | 4/2010 | Ishikawa |
| 2010/0095367 A1 | 4/2010 | Narayanaswamy |
| 2010/0250928 A1 | 9/2010 | Goto |
| 2010/0299158 A1 | 11/2010 | Siegel |
| 2010/0316216 A1 | 12/2010 | Fukushima et al. |
| 2010/0322248 A1 | 12/2010 | Ivanov |
| 2011/0019574 A1 | 1/2011 | Malomsoky et al. |
| 2011/0073490 A1 | 3/2011 | Hayamizu et al. |
| 2011/0280149 A1 | 11/2011 | Okada et al. |
| 2011/0320394 A1 | 12/2011 | McKeown et al. |
| 2012/0130745 A1 | 5/2012 | Jones |
| 2012/0166962 A1 | 6/2012 | Lunsford |
| 2012/0176917 A1 | 7/2012 | Matityahu et al. |
| 2012/0215328 A1 | 8/2012 | Schmelzer |
| 2012/0243533 A1 | 9/2012 | Leong |
| 2012/0294305 A1 | 11/2012 | Rose et al. |
| 2013/0010608 A1 | 1/2013 | Ramachandran et al. |
| 2013/0042323 A1 | 2/2013 | Narayanaswamy |

(56) References Cited

U.S. PATENT DOCUMENTS

| | | | |
|---|---|---|---|
| 2013/0064084 | A1 | 3/2013 | Babbar et al. |
| 2013/0103734 | A1 | 4/2013 | Boldyrev et al. |
| 2013/0166730 | A1 | 6/2013 | Wilkinson |
| 2013/0176842 | A1 | 7/2013 | Bauchot et al. |
| 2013/0232104 | A1 | 9/2013 | Goyal et al. |
| 2013/0305357 | A1 | 11/2013 | Ayyagari et al. |
| 2014/0040451 | A1 | 2/2014 | Agrawal et al. |
| 2014/0077956 | A1 | 3/2014 | Sampath et al. |
| 2014/0142972 | A1 | 5/2014 | Hosenfeld, Jr. |
| 2014/0164584 | A1 | 6/2014 | Joe et al. |
| 2014/0222998 | A1 | 8/2014 | Vasseur et al. |
| 2014/0304211 | A1 | 10/2014 | Horvitz |
| 2015/0134554 | A1 | 5/2015 | Clais et al. |
| 2015/0199613 | A1 | 7/2015 | Ruiz et al. |
| 2015/0229661 | A1 | 8/2015 | Balabine et al. |
| 2015/0249512 | A1 | 9/2015 | Adimatyam et al. |
| 2015/0331771 | A1 | 11/2015 | Conway |
| 2016/0055335 | A1* | 2/2016 | Herwono ............ H04L 63/1408 726/23 |
| 2016/0182274 | A1 | 6/2016 | Kiesekamp et al. |
| 2016/0219066 | A1 | 7/2016 | Vasseur et al. |
| 2016/0359872 | A1 | 12/2016 | Yadav et al. |
| 2017/0288974 | A1 | 10/2017 | Yoshihira et al. |
| 2017/0310703 | A1* | 10/2017 | Ackerman .......... H04L 63/1458 |
| 2018/0084011 | A1* | 3/2018 | Joseph ................ H04L 63/1416 |
| 2018/0109507 | A1 | 4/2018 | Caldera et al. |

OTHER PUBLICATIONS

Official Communication for U.S. Appl. No. 12/326,672 dated Dec. 23, 2010 (15 pages).
Official Communication for U.S. Appl. No. 12/326,672 dated Jun. 22, 2011 (16 pages).
Official Communication for U.S. Appl. No. 12/326,672 dated Oct. 24, 2011 (9 pages).
Lin, Mark, "An Overview of Session Hijacking at the Network and Application Levels," Jan. 18, 2005 (16 pages).
U.S. Appl. No. 11/683,643, entitled "Detecting Anomalous Network Application Behavior", by Jesse Abraham Rothstein and Arindum Mukerji, filed Mar. 8, 2007 (40 pages).
U.S. Appl. No. 11/679,356, entitled "Capture and Resumption of Network Application Sessions", by Jesse Abraham Rothstein and Arindum Mukerji, filed Feb. 27, 2007 (37 pages).
Official Communication for U.S. Appl. No. 11/683,643 dated Apr. 28, 2010 (35 pages).
Official Communication for U.S. Appl. No. 11/683,643 dated Oct. 14, 2010 (43 pages).
Official Communication for U.S. Appl. No. 11/683,643 dated Aug. 25, 2011 (43 pages).
Official Communication for U.S. Appl. No. 11/683,643 dated Jan. 23, 2012 (6 pages).
Official Communication for U.S. Appl. No. 13/831,626, dated Sep. 3, 2013, (17 pages).
Official Communication for U.S. Appl. No. 13/831,673 dated Sep. 30, 2013, (10 pages).
Official Communication for U.S. Appl. No. 13/831,673 dated Mar. 6, 2014, (12 pages).
Official Communication for U.S. Appl. No. 13/831,673 dated May 22, 2014, (5 pages).
Official Communication for U.S. Appl. No. 14/518,996 dated Nov. 20, 2014, (41 pages).
Official Communication for U.S. Appl. No. 13/831,908 dated Jun. 25, 2014, (15 pages).
Official Communication for U.S. Appl. No. 14/500,893 dated Nov. 20, 2014, (15 pages).
Official Communication for U.S. Appl. No. 13/831,908 dated Apr. 9, 2014, (3 pages).
Official Communication for U.S. Appl. No. 13/831,908 dated Aug. 9, 2013, (29 pages).
Official Communication for U.S. Appl. No. 13/831,908 dated Jan. 13, 2014, (31 pages).
Official Communication for U.S. Appl. No. 14/107,631 dated Dec. 30, 2014, (12 pages).
Handel et al. "Hiding Data in the OSI Network Model," Los Alamos, New Mexico, 1996, (16 pages).
Official Communication for U.S. Appl. No. 14/107,631 dated Feb. 20, 2014, (16 pages).
Official Communication for U.S. Appl. No. 14/107,631 dated Sep. 26, 2014, (14 pages).
Handley et al., "Network Intrusion Detection: Evasion, Traffic Normalization, and End-to-End Protocol Semantics," 2011, International Computer Science Institute, (17 pages).
Information Sciences Institute, "Internet Protocol Darpa Internet Program Protocol Specification," Sep. 1981, (36 pages).
Fuertes, "Evaluation of OSPF Extensions in MANET Routing," Paris, 2007, (192 pages).
Parsons, "Moving Across the Internet: Code-Bodies, Code-Corpses, and Network Architecture," May 9, 2010, (20 pages).
Zander et al., "Covert Channels and Countermeasures in Computer Network Protocols," Dec. 2007, (7 pages).
Official Communication for U.S. Appl. No. 14/500,893 dated Feb. 18, 2015, (11 pages).
Official Communication for U.S. Appl. No. 14/107,580 dated Mar. 6, 2014, (13 pages).
Official Communication for U.S. Appl. No. 14/107,580 dated Sep. 5, 2014, (15 pages).
Official Communication for U.S. Appl. No. 14/107,580 dated Mar. 17, 2015, (5 pages).
Official Communication for U.S. Appl. No. 11/679,356 dated Jun. 22, 2009, (21 pages).
Official Communication for U.S. Appl. No. 11/679,356 dated Dec. 11, 2009, (23 pages).
Official Communication for U.S. Appl. No. 11/679,356 dated Feb. 22, 2010, (3 pages).
Official Communication for U.S. Appl. No. 11/679,356 dated Sep. 9, 2010, (7 pages).
Official Communication for U.S. Appl. No. 11/679,356 dated Mar. 4, 2011, (15 pages).
Official Communication for U.S. Appl. No. 15/014,932 dated Jun. 10, 2016, (20 pages).
Official Communication for U.S. Appl. No. 15/014,932 dated Dec. 14, 2016, (26 pages).
Digital Imaging and Communications in Medicine (DICOM), Part 6: Data Dictionary, PS 3.6-2011. 2011, http://dicom.nema.org/Dicom/2011 /11_06pu.pdf, 255 pages.
Health Level Seven, Version 2.6, Appendix A. Nov. 2007, https://www.hl7.org/special/committees/vocab/V26_Appendix_A.pdf, 216 pages.
Official Communication for U.S. Appl. No. 15/207,213 dated Jun. 1, 2017, (24 pages).
Official Communication for U.S. Appl. No. 15/207,213 dated May 8, 2017, (5 pages).
Official Communication for U.S. Appl. No. 15/207,213 dated Feb. 23, 2017, (24 pages).
Official Communication for U.S. Appl. No. 15/207,213 dated Oct. 25, 2016, (18 pages).
Official Communication for U.S. Appl. No. 15/014,932 dated Aug. 1, 2017, (27 pages).
Official Communication for U.S. Appl. No. 15/690,135 dated Jan. 18, 2018, (6 pages).
Office Communication for U.S. Appl. No. 15/891,273 dated Jun. 19, 2018, pp. 1-23.
Office Communication for U.S. Appl. No. 15/014,932 dated Jul. 16, 2016, pp. 1-3.
Office Communication for U.S. Appl. No. 15/892,327 dated Apr. 23, 2018, pp. 1-35.
Office Communication for U.S. Appl. No. 15/014,932 dated May 15, 2018, pp. 1-27.

* cited by examiner

ADAPTIVE NETWORK MONITORING WITH TUNEABLE ELASTIC GRANULARITY

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

In some cases, network monitoring may require capturing or otherwise providing network traffic to analysis appliances, analysis services, packet capture data stores, or the like. In large or complex networks, capturing network traffic for monitoring or the compute resources required for analysis of network traffic may be expensive. And, given the dynamic nature and complexity of modern networks, it may be difficult to balance the amount of resources expended for network monitoring with the need for network monitoring. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE INVENTION

Figure 1:
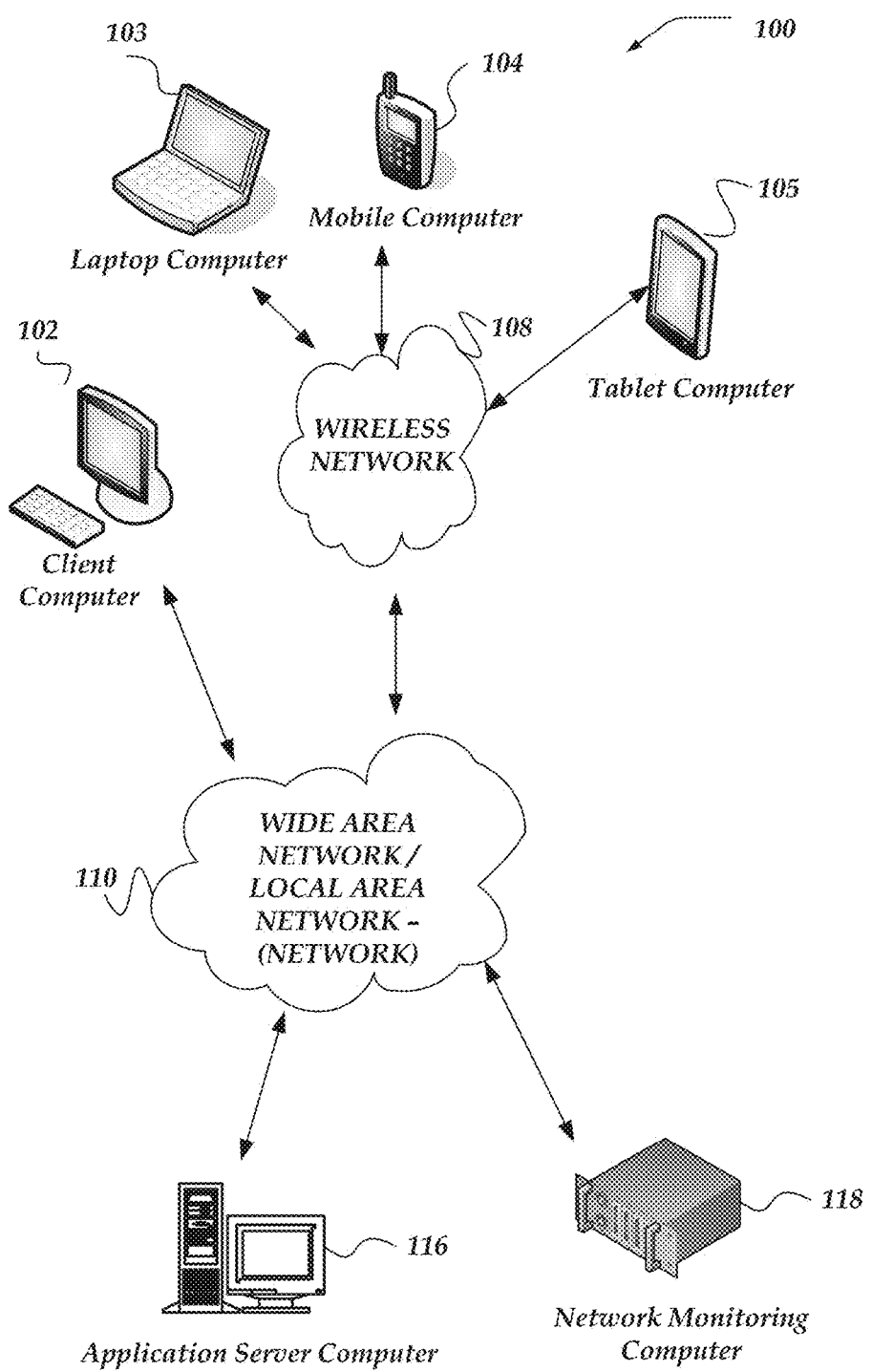
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In one or more of the various embodiments, NMCs and/or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "agent" refers to an actor in the monitored network. Agents may include applications, services, programs, processes, network devices, or the like, operating in the monitored network. For example, individual agents may include, web clients, web servers, database clients, database servers, mobile app clients, payment processors, groupware clients, groupware services, or the like. In some cases, multiple agents may co-exist on the same network computer, process, application, or cloud compute instance.

As used herein, the term "device relation model" refers to a data structure that is used to represent relationships between and among different agents in a monitored network. Device relation models may be graph models comprised of nodes and edges stored in the memory of a network computer. In some embodiments, the network computer may automatically update the configuration and composition of the device relation model stored in the memory of the network computer to reflect the relationships between two or more agents in the monitored network. Nodes of the graph model may represent agents in the network and the edges of the graph model represent the relationship between agents in the network. Device relation models may improve the performance of computers at least by enabling a compact representation of agents and relationships in large networks to reduce memory requirements.

As used herein, the "device profile" refers to a data structure that represents the characteristics of network devices or agents that are discovered in networks monitored by NMCs. Values or fields in device profiles may be based on metrics, network traffic characteristics, network footprints, or the like, that have been collected based on passive network monitoring of network traffic in one or more monitored networks. Device profiles may be provided for various network devices, such as, client computers, server computers, application server computers, networked storage devices, routers, switches, firewalls, virtual machines, container instances (e.g., containerized services), cloud instances, or the like.

As used herein, the "application profile" refers to a data structure that represents the characteristics of applications or services that are discovered in networks monitored by NMCs. Values or fields in application profiles may be based on metrics, network traffic characteristics, network footprints, or the like, that have been collected based on passive network monitoring of network traffic in one or more monitored networks. Application profiles may be provided for various applications, such as, client computers, server computers, application server computers, networked storage devices, routers, switches, firewalls, virtual machines, container instances (e.g., containerized services), cloud instances, or the like. For example, application profiles may be provided for web clients, web servers, database clients, database servers, credentialing services, mobile application clients, payment processors, groupware clients, groupware services, micro-services, container based services, document management clients, document management services, billing/invoicing systems, building management services, healthcare management services, VOIP clients, VOIP servers, or the like.

As used herein, the term "entity profile" refers to a data structure that represent the characteristics of a network entity that may be a combination of device profiles and application profiles. Entity profiles may also include additional values or fields based on metrics, network traffic characteristics, network footprint, or the like, that have been collected based on passive network monitoring of network traffic in one or more monitored networks. For example, an entity profile may be provided for application servers where the entity profile is made from some or all of the device profile of the computer running or hosting the applications and some or all of the application profiles associated with the applications or services that are running or hosting one the computer. In some cases, multiple services or applications running on devices may be included in the same entity profile. In other cases, entity profiles may be arranged in hierarchal data structure similar to an object oriented computer languages class hierarchy.

As used herein, the term "observation port" refers to network taps, wireless receivers, port mirrors or directed tunnels from network switches, clients or servers, virtual machines, container instances (e.g., containerized services), cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term "trigger" refers to data object that is associated one or more activation conditions and one or more activation actions, sometimes referred to as conditions and actions. If the activation conditions for a trigger are met, the activation actions may be performed. Conditions or actions may be arbitrary in the sense that triggers may be configured based on unique requirements or circumstances associated with a monitored networking environment. Typically, activation conditions may include expressions or terms that compare information collected from monitoring network traffic to one or more threshold values, states, patterns, or the like. One or more of the particular condition expressions may be built-in to NMCs. Whereas, other condition expressions may be based on configuration information, rule-based policies, user-inputs, plug-ins, scripts, programs, or the like, or combination thereof. Similarly, activation actions may be comprised of one or more actions. One or more of the particular actions may be built-in actions. Whereas, other actions may be defined based on configuration information, rule-based policies, user-inputs, plug-ins, scripts, programs, or the like, or combination thereof.

As used herein, the term "monitoring trigger" refers to a trigger that includes actions designed to modify the inspection detail for one or more entities or networks.

As used herein, the term "alert trigger" refers to a trigger that includes actions designed to provide alerts, such as, notifications, messages, alarms, events, log entries, or the like when its activation conditions are met.

As used herein, the term "inspection detail" refers to the quality or amount of network monitoring perform by an NMC. Generally, increasing inspection detail consumes more resources of the NMC, other entities, the networking environment, or the like. Increasing inspection detail may include, increasing sample rates, increasing packet inspection detail (e.g., deep packet inspection versus tuple inspection), capturing more network packets, capturing whole Ethernet frames versus limiting capture to application protocol frames, monitoring or collecting additional network metrics, monitoring additional networks or entities, monitoring additional relationships between entities, monitoring individual users, tracking behavior against application or protocol state machines, or the like, or combination thereof. NMCs may employ one or more monitoring triggers that may be associated with one or more actions that increase or decrease inspection detail by modifying the inspection detail for different network flows, entities, users, applications, services, and so on.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic using one or more network computers or network monitoring computers. In one or more of the various embodiments, a monitoring engine may be instantiated to perform various actions, including, providing one or more monitoring triggers such that each monitoring trigger may be associated with one or more conditions and one or more actions.

In one or more of the various embodiments, the monitoring engine may monitor information that is associated with network traffic associated with one or more networks based on an inspection detail level.

In one or more of the various embodiments, the monitoring engine may compare the monitored information to the one or more conditions associated with the one or more monitoring triggers.

In one or more of the various embodiments, the monitoring engine may activate one or more of the one or more monitoring triggers based on a result of the comparison.

In one or more of the various embodiments, the monitoring engine may modify the inspection detail level based on the one or more actions associated with the activated monitoring triggers such that the modification of the inspection detail level increases the amount of the information monitored by the monitoring engine. In one or more of the various embodiments, increasing the amount of the information monitored by the monitoring engine, may include collecting more data, collecting different data, monitoring additional agents, capturing network packets, capturing increased portions of network packets, or the like, or combination thereof.

In one or more of the various embodiments, the actions of the one or more activated monitoring triggers may include increasing the inspection detail based on one or more occurrences of a file access event such that additional information is analyzed to determine whether the one or more occurrences of the file access event may be a malicious attack on a file server.

In one or more of the various embodiments, the actions of the one or more activated monitoring triggers may further include: identifying monitored information that may be associated with an application; and if a behavior of a user in communication with the application matches behavior corresponding to a malicious state machine, increasing the inspection detail.

In one or more of the various embodiments, the monitoring engine may provide a resource budget that may be associated with the one or more networks and the one or more activated monitoring triggers.

In one or more of the various embodiments, if a total resource cost associated with the one or more activated monitoring triggers exceeds the resource budget, the monitoring engine may allocate a portion of the resource budget to one or more of the one or more activated monitoring triggers based on, heuristics, such as, one or more priority scores that are associated with each of the one or more monitoring triggers. Also, in some embodiments, a machine learning engine may be use artificial intelligence to identify one or more advantageous allocations for a given strategy (e.g., policy).

In one or more of the various embodiments, the monitoring engine may de-activate a remainder of the one or more activated monitoring triggers that are excluded from the resource budget such that allocating the resource cost associated with each deactivated monitoring trigger to the resource budget exceeds the resource budget.

In one or more of the various embodiments, an analysis engine may be instantiated to perform actions, including, providing analysis of the network traffic based on the monitored information.

In one or more of the various embodiments, an alert engine may be instantiated to perform actions, including, providing one or more alert triggers such that each alert trigger may be associated with one or more conditions and one or more actions.

In one or more of the various embodiments, the alert engine may activate one or more of the one or more alert triggers based on the result of the comparison between the information to the one or more conditions associated with the one or more alert triggers. And, in one or more of the various embodiments, the alert engine may provide one or more alerts based on the one or more activated alert triggers.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116 and network monitoring computer 118, each as a single computer, the innovations and/or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Likewise, in one or more of the various embodiments, application server computer 116, or network monitoring computer 118 may be implemented using one or more containers in one or more container computing environments. Accordingly, these innovations and embodiments are not to be construed as being limited to a single environment, and other configurations, and other architectures are also envisaged.

Illustrative Client Computer

Figure 2:
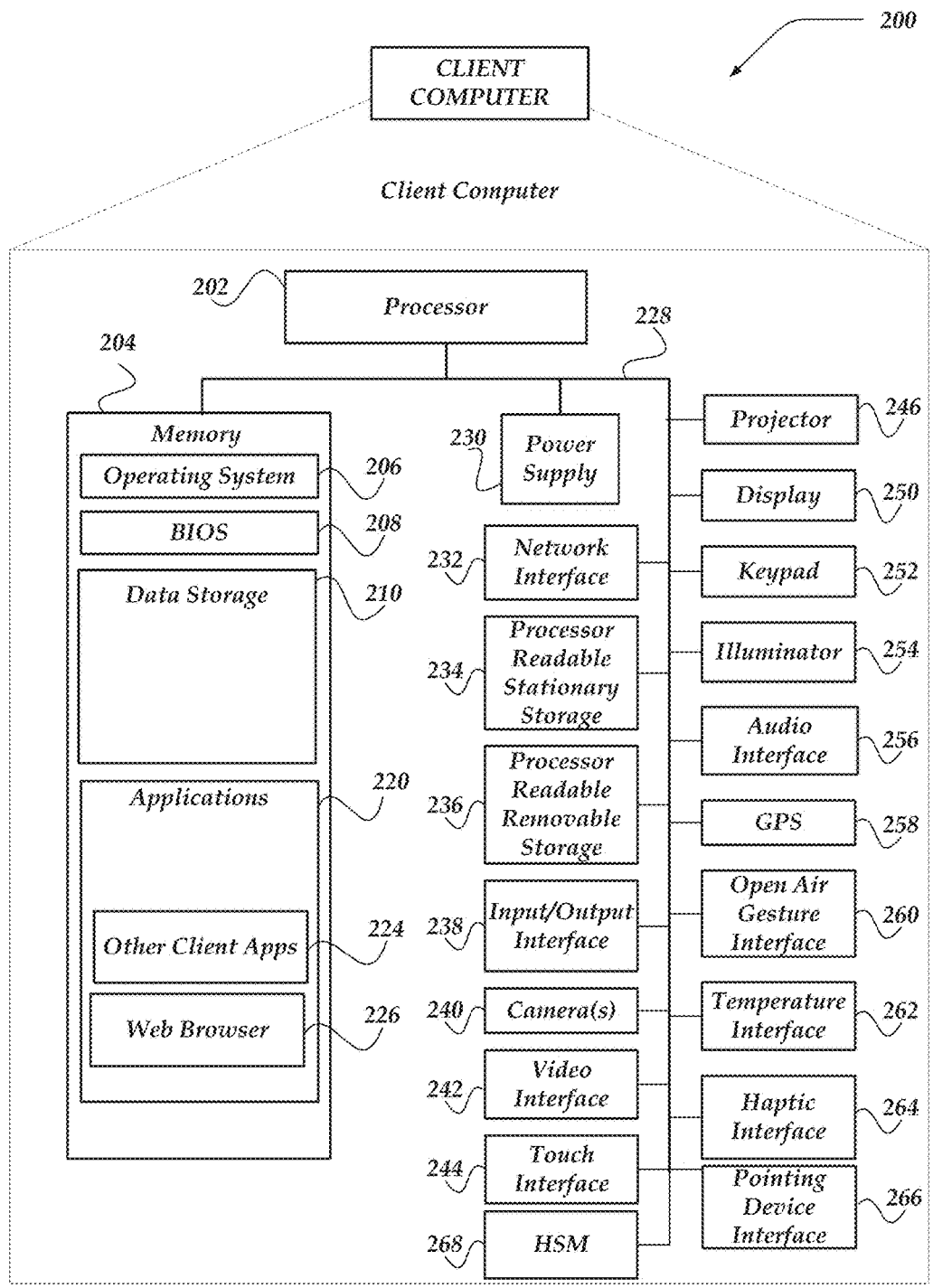
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Network Computer

Figure 3:
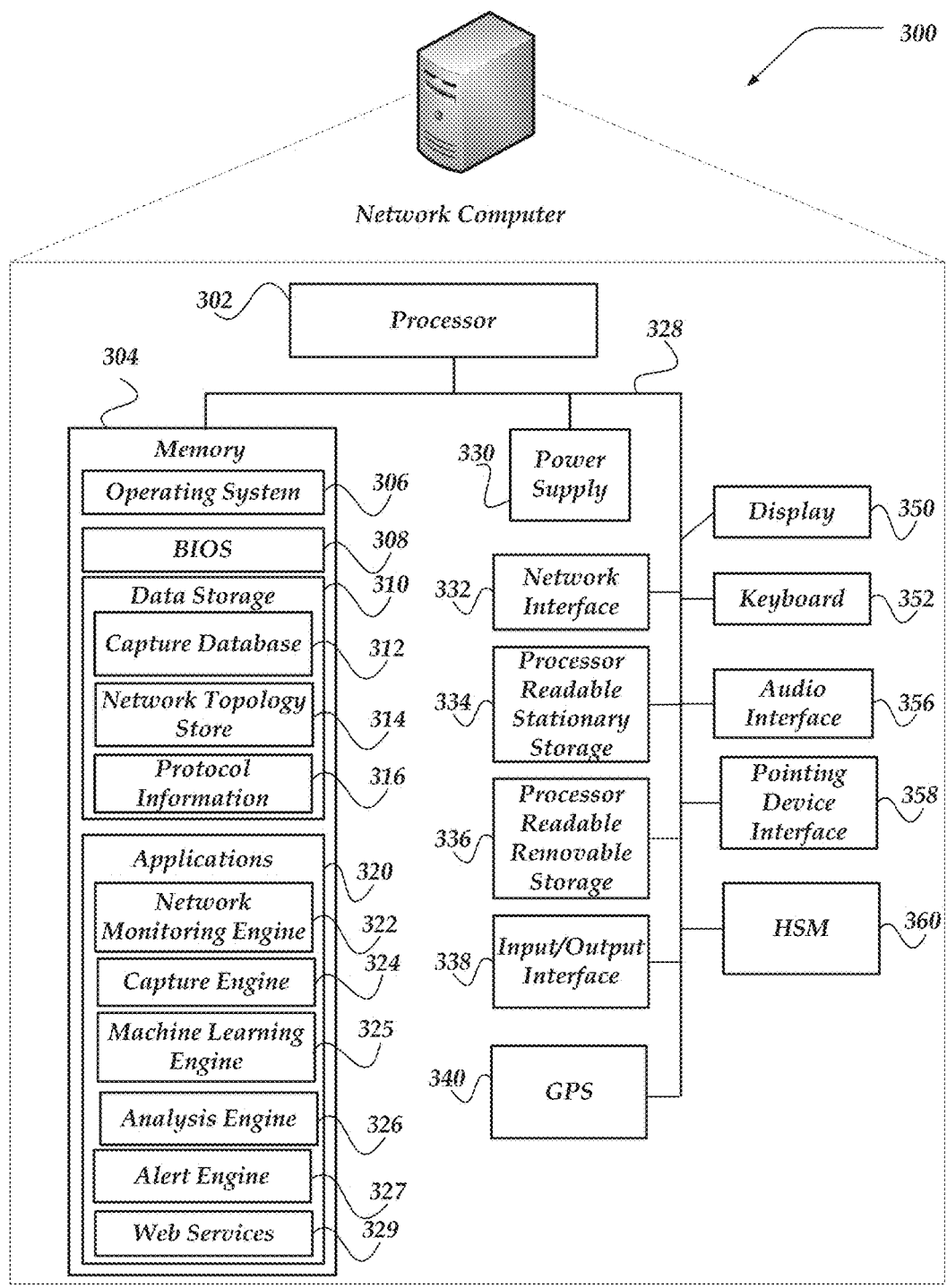
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, capture engine 324, machine learning engine 325, analysis engine 326, alert engine 327, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, reports, as well as internal processes and/or databases. In at least one of the various embodiments, geo-location information used for selecting localization information may be provided by GPS 340. Also, in some embodiments, geolocation information may include information provided using one or more geolocation protocols over the networks, such as, wireless network 108 and/or network 111.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, capture database 321, network topology database 314, protocol information 316, or the like. Capture database 312 may be a database arranged for storing network metrics or network traffic collected by an NMC. Network topology database 314 may be a data store that contains information related to the topology of one or more network monitored by a NMC. And, protocol information 316 may store various rules and/or configuration information related to one or more network communication protocols, including application protocols, secure communication protocols, client-server protocols, peer-to-peer protocols, shared file system protocols, or the like, that may be employed in a monitored network environment.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, capture engine 324, machine learning engine 325, analysis engine 326, alert engine 327, web services 329, or the like, that may be arranged to perform actions for embodiments described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, network monitoring engine 322, capture engine 324, machine learning engine 325, analysis engine 326, alert engine 327, web services 329, or the like, may be operative in a cloud-based computing environment. In one or more of the various embodiments, these applications, and others, that comprise the network monitoring computer may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment.

Likewise, in one or more of the various embodiments, network monitoring engine 322, capture engine 324, machine learning engine 325, analysis engine 326, alert engine 327, web services 329, or the like, may be operative in a container-based computing environment. In one or more of the various embodiments, these applications, and others, that comprise the network monitoring computer may be containerized or otherwise executing within containers that may be managed in a container based computing environment. In one or more of the various embodiments, in this context the applications may flow from one physical network computer within the container-based environment to another depending on performance and scaling considerations automatically managed by the container computing environment.

Accordingly, in one or more of the various embodiments, virtual machines, containers, and/or virtual servers dedicated to network monitoring engine 322, capture engine 324, machine learning engine 325, analysis engine 326, alert engine 327, web services 329, or the like, may be provisioned and de-commissioned automatically.

Also, in one or more of the various embodiments, network monitoring engine 322, capture engine 324, machine learning engine 325, analysis engine 326, alert engine 327, web services 329, or the like, may be located in virtual servers running in a cloud-based computing environment or containers in containerized computing environments rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
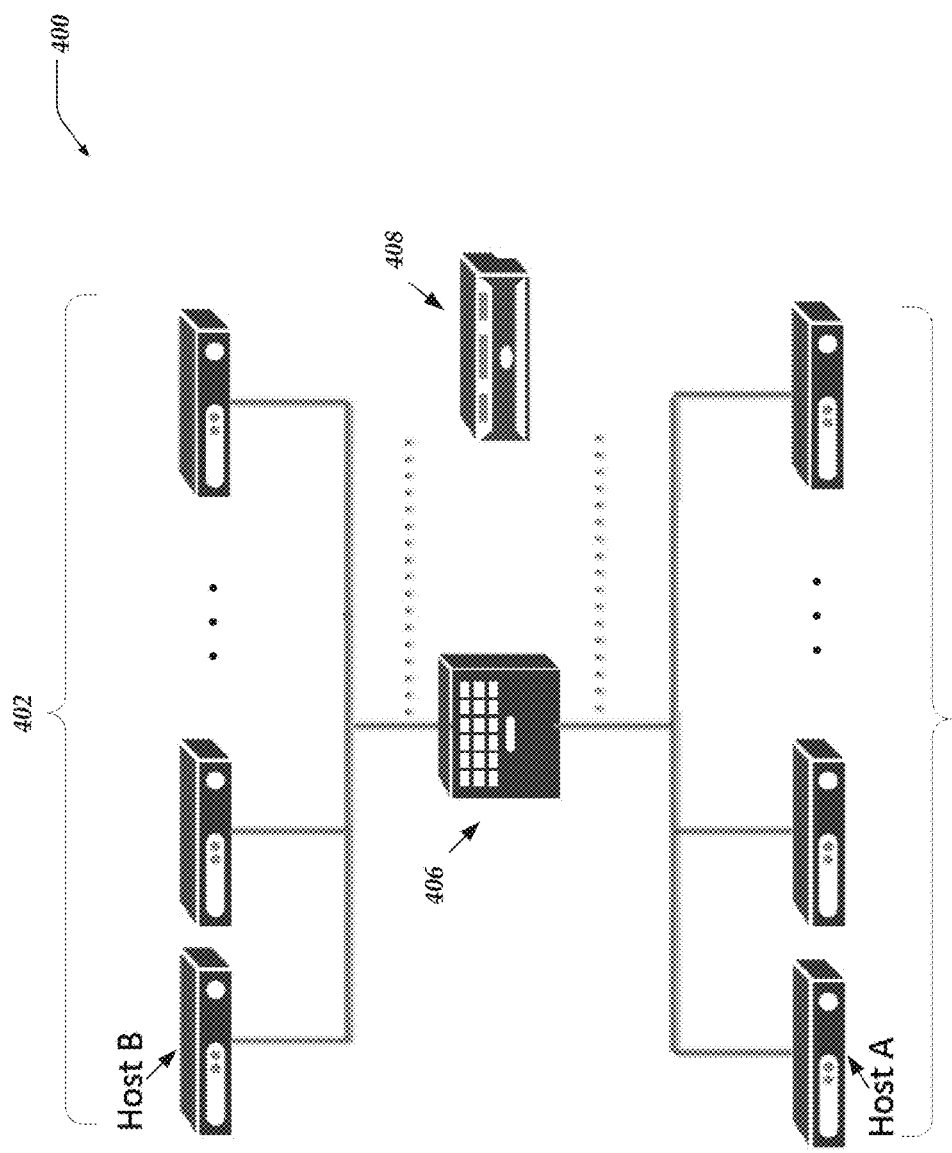
FIG. 4 illustrates a logical architecture of a system for adaptive network monitoring with tuneable elastic granularity in accordance with one or more of the various embodiments.

FIG. 4 illustrates a logical architecture of system 400 for adaptive network monitoring with tuneable elastic granularity in accordance with one or more of the various embodiments. System 400 may be arranged to include a plurality of network devices and/or network computers on first network 402 and a plurality of network devices and/or network computers on second network 404. Communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, containers (e.g., containerized services), virtual machines, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

In one or more of the various embodiments, NMCs may be arranged to employ adaptive networking monitoring to balance the tradeoffs associated with monitoring detail, monitoring cost, monitoring performance impact, or the like, or combination thereof. In some embodiments, NMCs may instantiate one or more network monitoring engines that execute one or more policies to adaptively tune or modify monitoring detail or monitoring responses. Accordingly, in one or more of the various embodiments, the type, detail, or granularity of monitoring may be modified based on one or more policy rules that include or define rules, conditions, dependencies, weights, performance budgets, or the like, the may determine the type, detail, or granularity of monitoring for one or more networks.

Figure 5:
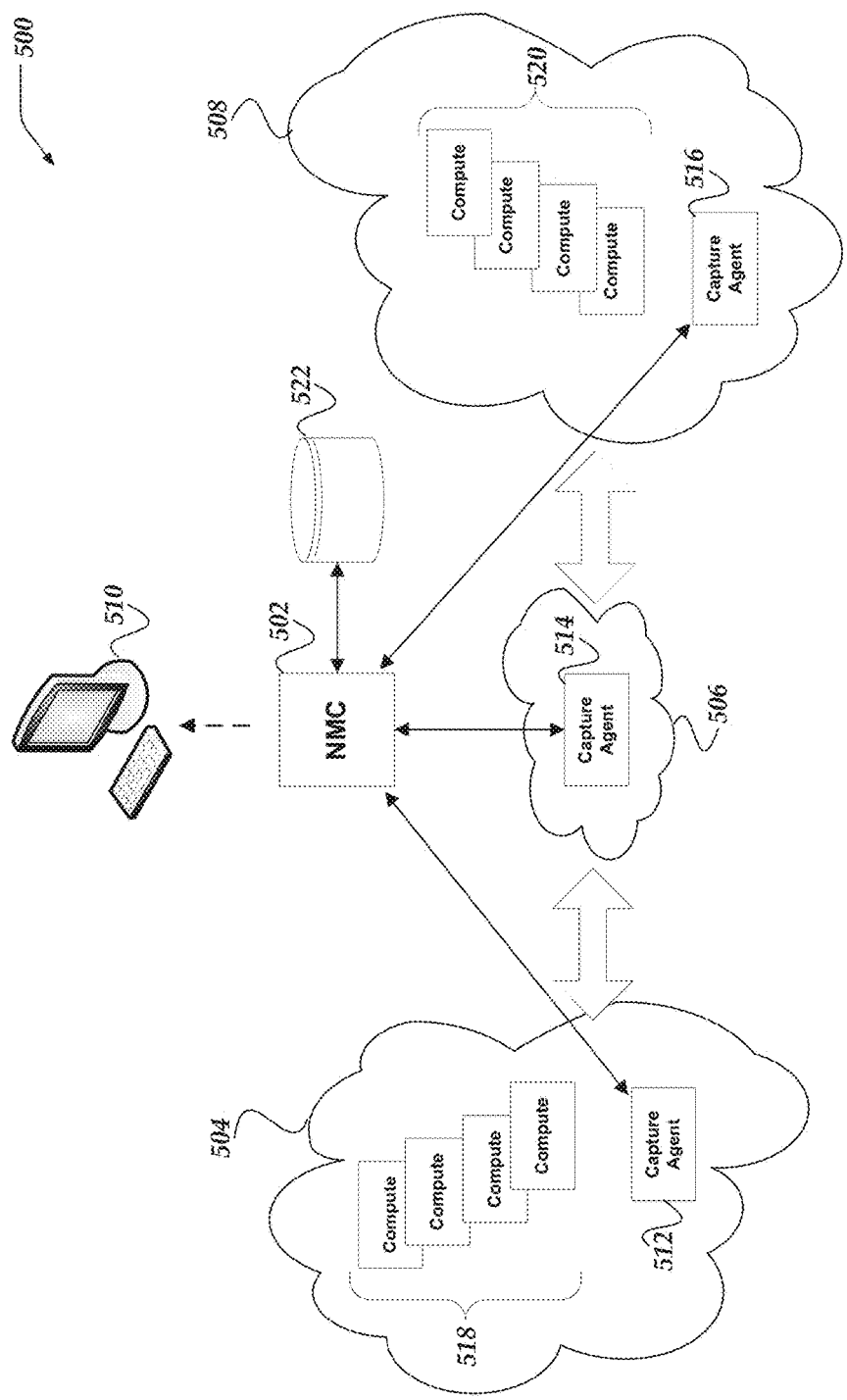
FIG. 5 illustrates a logical schematic of a system for adaptive network monitoring with tuneable elastic granularity in accordance with one or more of the various embodiments.

FIG. 5 illustrates a logical schematic of system 500 for adaptive network monitoring with tuneable elastic granularity in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect traffic metrics that may be provided to NMC 502 for additional analysis.

In one or more of the various embodiments, capture agents may be NMCs that are distributed in various networks or cloud environments. For example, in some embodiments, a system may include one or more NMCs that provide network monitoring, capture agent services, or alert services. In some embodiments, capture agents may be NMCs arranged to instantiate one or more capture engines, such as, capture engine 324 to perform one or more capture or collection actions. Similarly, in one or more of the various embodiments, one or more capture agents may be instantiated or hosted separately from one or more NMCs.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), containers (e.g., containerized services), or the like. However, one of ordinary skill in the art will appreciate that entities may be various network computers, network appliances, routers, applications, services, users, switches, network interfaces, or the like, subject to network monitoring by one or more NMCs. (See, FIG. 4, as well).

In this example, for one or more of the various embodiments, capture agents, such as capture agent 512 may be arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a capture data store, such as, capture data store 522. Accordingly, in one or more of the various embodiments, it may be advantageous to selectively capture and store network traffic to reduce costs associated with such data stores rather than capture or store all network traffic. For example, in some embodiments, to reduce expenses related to storing captured network packets, an NMC may be arranged to selectively store captured network packets based on various rule-based policies, monitoring triggers, or machine learning based evaluations.

In one or more of the various embodiments, communicating a high-volume of network traffic as a matter of course from capture agents to NMCs may be a costly activity depending on the networking environment (e.g., third-party cloud environments or other metered environments) used by the organization. Also, in some embodiments, if direct costs are not at issue, excessive or unnecessary network traffic related to network monitoring may impact overall network performance or network capacity. For example, if capture agents forwarding all network traffic to NMCs for analysis, the network traffic related to the capture agents may be significant.

Accordingly, in one or more of the various embodiments, NMCs may be arranged to adapt or tune monitoring behavior based on one or more circumstances that may be defined by one or more monitoring triggers, machine learning based evaluations, or other rule-based policies.

Also, in one or more of the various embodiments, depending on the circumstances, NMCs monitoring networks or monitoring network entities may generate many alerts associated with monitored network traffic. In some embodiments, among other things, the volume or rate of alerts may make it difficult for an organization to effective report to alerts. Accordingly, in some embodiments, one or more important or concerning anomalies may be missed or neglected in a flood of alerts that may be associated with less important or less concerning anomalies. Thus, in one or more of the various embodiments, NMCs may be arranged to mitigate this type of information overload by using one or more alert triggers that may improve the identification of more important anomalies and highlighting, surfacing, or otherwise bringing attention to their associated alert in comparison to alerts associated with less important anomalies.

In one or more of the various embodiments, triggers associated with adapting or tuning monitoring actions may be consider to be monitoring triggers. Triggers associated with providing alerts may be considered alert triggers. Generally, in some embodiments, triggers are arranged to have a set of activation conditions and a set of activation actions. Accordingly, in one or more of the various embodiments, if the activation conditions for a trigger are met, the NMCs or monitoring engines may be arranged to execute the one or more activation actions associated with the trigger.

In one or more of the various embodiments, activation conditions may include a combination of threshold values, Boolean logic, arithmetic comparison, pattern matching (e.g., regular expressions), heuristic tests, or the like. In some embodiments, one or more activation conditions may be nested or embedded as part of other conditions.

In one or more of the various embodiments, one or more activation conditions or portions of activation conditions may be designed for re-use. Likewise, for activation actions.

Accordingly, in one or more of the various embodiments, processor executable instructions for evaluating conditions or performing actions associated with one or more activation conditions or portions of activation conditions may be stored in libraries, repositories, or the like, to facility their re-use.

In one or more of the various embodiments, NMCs arranged to use monitoring triggers enable organizations to surgically apply increased inspection detail to particular parts of their networking environments under defined conditions rather than relying on a global level of inspection detail. Accordingly, an organization does not have to build networking capacity to match a fixed level network monitoring inspection detail. These innovations herein enable organizations to gain the benefit of detailed network monitoring, packet inspection, packet capture, or the like, without having to expand the capacity of their entire network because monitoring triggers as described herein, may be employed to target specific entities of a network for increased inspection detail.

Likewise, in some embodiments, innovations, such as alert triggers, may be employed to selectively generate or forward alerts based on various alert trigger activation conditions. These activation conditions may be narrowly or broadly targeted to help organizations notice or respond to alerts related to important anomalies or events.

In one or more of the various embodiments, monitoring engines or alert engines may be arranged to include failsafe mechanisms that guard against too many triggers being activated at the same time. In some embodiments, such mechanisms may be designed to prevent an over consumption of network or monitoring resources that may be caused by too many triggers activating at the same. In some embodiments, mechanisms may include one or more heuristics that limit the number of trigger actions that may occur in a given time period. Also, in some embodiments, triggers limits, or the like, may be determined by a machine learning engine that may be arranged to optimize the allocation of resources based on a monitoring strategy. Further, as discussed below in more detail, NMCs may provide a resource budgeting mechanism that may limit the number of triggers to activate.

In one or more of the various embodiments, a NMC may instantiate one or more machine learning engines, such as machine learning engine 325, to perform various actions, such as, training classifiers, training machine learning models, or the like. Also, in one or more of the various embodiments, one or more machine learning engines may be arranged to employ the one or more machine learning models to evaluate some or all of the monitored networks, network traffic, captured data, metrics, or the like. Accordingly, in one or more of the various embodiments, machine learning may be incorporated into trigger conditions to trigger actions based on signals, scores, classifications, or the like, identified by the machine learning engine.

In one or more of the various embodiments, various machine learning models (e.g., classifiers, regression models, or the like) may be trained or developed based on historical network data or metrics and then used to provide evaluations of monitored network traffic. In some cases, the data or metrics used to train or evaluate machine learning models may be archived data associated with other networks. Also, in one or more of the various embodiments, as data or metrics associated with an organization's network is collected, one or more machine learning models may be developed, trained, or re-trained based on the data or metrics collected for the organization's network.

Further, in one or more of the various embodiments, one or more users may be enabled to provide feedback to the machine learning engine regarding the quality of the machine learning evaluations. This feedback may be used by the machine learning engine to adapt or re-training one or more machine learning models based on the user feedback.

Monitoring Triggers

In one or more of the various embodiments, various monitoring triggers may have activation conditions based on various network operation metrics or network traffic characteristics collected or discovered by one or more monitoring engines. In some embodiments, one or more capture agents or capture engines may collect some or all metrics or characteristics and provide them to one or more NMCs or monitoring engines for further analysis.

In one or more of the various embodiments, monitoring triggers may be associated with one or more anomalies that trigger the NMCs to increase or decrease the detail level of the monitoring. Accordingly, the impact of network monitoring on the overall performance of the monitored networks may be managed. Likewise, the analysis capacity of the NMCs may be conserved for analyzing network traffic that may appear to be suspicious. Accordingly, network traffic associated with anomalous activity or traffic may be allocated more NMC resources than normal activity or normal traffic.

In one or more of the various embodiments, higher level or otherwise low-impact monitoring may be directed to some or all network flows unless one or more monitoring triggers determines that the monitoring or inspection detail should be increased. The NMCs may monitor the results (metrics or network traffic characteristics) of the increased inspection detail to determine if additional actions (e.g., modification to inspection detail, alerts, or the like) should be taken. If the increased inspection detail indicates that the one or more network flows are of no concern, the NMCs may be arranged to reduce inspection detail for those flows.

In one or more of the various embodiments, monitoring triggers may be associated with priority scores, resource costs, or the like. Priority scores may enable NMCs to prioritize triggers if two or more activated triggers or their activation actions are contending for limited resources (e.g., resource budgets). Also, in some embodiments, resource cost values (cost values) represent a expense of triggers (or trigger actions) in term of resource budgets. In some embodiments, triggers that consume more compute resources, data storage resources, networking capacity, or the like, may be associated with higher costs values than triggers that consume less compute resources, data storage resources, networking capacity, or the like. Thus, in combination, the priority scores and resource costs along with resource budgets may be used to determine which triggers to activate.

For example, in some embodiments, if an NMC is arranged to have a resource budget of 1000 units, and four triggers are pending where trigger A has a priority score of 100 and a resource cost of 500, trigger B has a priority score of 70 and a resource cost of 400, trigger C has a priority score of 65 and a resource cost of 200, and trigger D has a priority score of 30 and a resource cost of 100, and NMCs may determine that trigger A, trigger B, and trigger D may be activated. In this example, trigger C is excluded because even though it has a higher priority than trigger D, it consumes too many resources. But, because trigger D can fit in the budget it may be activated even though it has a lower priority than trigger C. Likewise, in one or more of the various embodiments, if all the pending triggers fit in a resource budget or resource budgets are not being used, subject to other consideration (e.g., heuristic based limiters) all the triggers may be activated.

In one or more of the various embodiments, monitoring triggers may be arranged to increase inspection detail by performing various actions, including collecting more data, collecting different data, monitoring additional agents on the network, capturing network packets, capturing increased portions of network packets (e.g., capturing the entire packet rather than protocol headers), or the like.

Accordingly, in one or more of the various embodiments, the increased inspection detail may enable additional triggers to be evaluated using the addition information collected via increased inspection detail. Also, in one or more of the various embodiments, one or more monitoring triggers that result in increased inspection detail may be associated with follow-on or follow up triggers that restore the inspection detail to normal upon the occurrences of one or more conditions, such as, time-outs, changes in behavior, other observed metric values, or the like. For example, trigger A may trigger increased inspection detail, while the activation conditions for trigger B may be dependent on the additional information provided by the activation of trigger A. Accordingly, trigger B may be arranged to roll back the increased inspection detail if the additional information meets its characteristics.

In one or more of the various embodiments, one or more monitoring triggers may be arranged to tune the inspection detail based on the occurrence of one or more file access events. For example, a trigger may be arranged to activate increased inspection detail if one or more sensitive files on a shared file server are accessed from an unexpected source or location. The increased inspection detail may enable additional information to be analyzed to determine if the file access activity is malicious.

In one or more of the various embodiments, one or more monitoring triggers may be arranged to tune the inspection detail based on the occurrence of one or more unexpected user logins to particular servers or services. For example, a trigger may be arranged to activate increased inspection detail if a user in an organization's marketing department unexpectedly logs into an engineering server. The increased inspection detail may enable additional information to be analyzed to determine if user is malicious. For example, the user may inadvertently attempt to access the services and then he or she immediately backs out. In this example, increased inspection detail might include monitoring the duration the user is logged in to the sensitive service as well as closely monitoring or capturing network traffic between the user and the sensitive service. Accordingly, in this example, the increased inspection may enable the NMC to determine the user is not a threat because he or she backed out quickly and made no attempt to copy sensitive information to another location.

In one or more of the various embodiments, one or more monitoring triggers may be arranged to tune the inspection detail based on the appearance or discovery of one or more unexpected network devices on the monitored networks. For example, a monitoring trigger may be arranged to activate increased inspection detail of network flows associated with the unexpected device. The increased inspection detail may enable additional information to be analyzed to determine if the device is malicious. For example, a malicious user may surreptitiously install a harmful device on a network. The increased inspection detail may enable the NMC to closely monitor the activity of the potentially harmful device while continuing to normally monitor other entities or parts of the network. If the increased inspection detail indicates that the device is safe or otherwise of no concern the inspection detail associated with that device may be restored to normal.

Similarly, in one or more of the various embodiments, one or more monitoring triggers may be arranged to tune the inspection detail based on the appearance or discovery of one or more unexpected services, applications, application protocols, transport protocols, encryption protocols, or the like. Also, monitoring triggers may be arranged to observe if one or more services, applications, application protocols, transport protocols, encryption protocols, or the like, are using unexpected network ports or accessing unexpected resources on the monitored networks.

In one or more of the various embodiments, one or more monitoring triggers may be arranged to tune inspection detail based on the public key infrastructure (PKI) security certificates used by various entities in the network. For example, in some embodiments, one or more monitoring triggers may be arranged to increase inspection detail for entities that are determined to be using untrusted or compromised security certificates.

In one or more of the various embodiments, one or more monitoring triggers may be arranged to tune inspection detail based on step-wise or transactional behavior that is expected for various services, applications, application protocols, transport protocols, encryption protocols, or the like. For example, in some embodiments, a monitoring trigger may activate a state machine, or the like, that is used to track the state, sequence of steps, request parameters, or the like, that may be associated with an application and its users. For example, a monitoring trigger may be activated to employ an application state machine if a new, unexpected, or unknown user begins to interact with the application. Accordingly, the NMCs may use the state machine to monitor if the user is acting like a valid or normal user. Thus, for example, if the user's behavior deviates from the states or steps prescribed by the state machine, the NMC may consider the user malicious.

Likewise, in some embodiments, NMCs may be arranged to include state machines that correspond to malicious activity. Accordingly, users or services performing actions that match the malicious activity state machines may be quickly identified as malicious. In one or more of the various embodiments, if the issue is resolved, the NMCs may reduce the inspection detail by releasing/discarding the state machine to free up memory and compute resources of the NMC. As well as reducing the amount of captured network traffic provided to the NMC for analysis.

In one or more of the various embodiments, one or more monitoring triggers may be arranged to activate based on the observation or detection of various application specific activities. In some embodiments, NMCs may be arranged to have a catalog of some or all of the applications that are operative in the monitored networks. Some or all of this catalog may be automatically populated based on observing well-known application characteristics in the monitored network traffic, such as, ports, user-agent information, application protocol headers or payload, or the like, or combination thereof. Also, in some embodiments, some of all of this catalog may be populated via configuration information or user input.

Accordingly, in one or more of the various embodiments, triggers may be arranged to activate if applications or application clients exchange network traffic that is uncharacteristic of the given application. Accordingly, one or more monitoring triggers may be arranged to increase inspection detail upon discovery of such anomalies. Likewise, in some embodiments, triggers may be arranged to activate if devices or hosts unexpectedly begin exchange application protocols that are not expected to hosted on a given device. For example, if a server computer dedicated to a database server is discovered to be exchanging FTP (file transfer protocol) application traffic with an outside client, it may activate a monitoring trigger to increase inspection detail for that network traffic. In this example, upon analysis of the increased inspection data, the NMC may discover that the content of the FTP traffic is of no concern, triggering a decrease in inspection detail. Or, if the NMC discovers that the FTP traffic is suspicious, additional monitoring triggers or alert triggers may be activated.

In one or more of the various embodiments, one or more activated monitoring triggers may cause one or more network flows to be subjected to increased inspection detail. For example, one or more triggers may be arranged to increase inspection detail for entire classes of network traffic or network entities. For example, if one network flow from a client computer is determined to be subject to increased inspection detail, a monitoring trigger may be arranged to automatically subject all network flows associated with the same client to increased inspection detail.

Also, in one or more of the various embodiments, one or more monitoring triggers may be arranged to activate increased inspection detail for one or more network flows that may be related to a network flow the trigger is monitoring. Related flows may be determined based on discovery or configuration information. For example, some application protocols may be well-known to use one or more network flows having particular characteristics for control signals and another network flow for data. Accordingly, if a trigger activates based on a control flow, its activation actions may cause the NMC to increase the inspection detail for data flows associated with the control flow.

In one or more of the various embodiments, one or more monitoring triggers may be arranged to passively monitor one or more network entities to establish one or more baseline values for one or more metrics. Accordingly, in some embodiments, such triggers may activate if the monitored metrics deviate from the baseline beyond a defined threshold.

In one or more of the various embodiments, one or more monitoring triggers may be arranged to aggregate the occurrences of anomalies, events, or conditions. In one or more of the various embodiments, this may include one or more accumulators that maintain a count of the occurrences of the one or more anomalies, events, or conditions. Accordingly, in one or more of the various embodiments, this enables one monitoring trigger (or alert trigger) to be configured to activate if the count of the occurrences of one or more anomalies, events, or conditions exceeds one or more defined thresholds.

In one or more of the various embodiments, activation conditions associated with monitoring triggers (or alert triggers) may include expressions that may be evaluated based on inputs from various sources, including other services via one or more APIs (including REST or REST-like APIs). In one or more of the various embodiments, inputs may include calendar information, scheduling information, or appointment information. For example, triggers may be provided that activate on particular days or if particular events or activities are scheduled to occur.

In one or more of the various embodiments, inputs from other services may include inputs provided by other departments such as, human resources, engineering, devops, or the like. For example, in some embodiments, an organization may configure one or more triggers that activate each time a new version of a product or service is deployed. In this example, increased inspection detail may be considered valuable to help identify defects related to the new product or service version. After the new release has been determined to be stable, the inspection detail may be restored to a normal level.

Similarly, in one or more of the various embodiments, another department of an organization may provide inputs that may activate one or more triggers. For example, in some embodiments, an organization may configure one or more triggers that activate if HR hires or terminates employees. In this example, inspection detail may be increased for network entities or network traffic associated with the new employee or the outgoing employee. Then, in this example, the inspection detail may be restored to normal after the new employee is trusted or the former employer is no longer considered a risk.

In one or more of the various embodiments, activation conditions may include new devices joining a monitored network. Accordingly, in one or more of the various embodiments, one or more monitoring triggers may be activated to increase inspection detail related to the new device. Depending on local policy, the inspection detail may later be restored to normal if the new device is later considered trusted or leaves the network.

In one or more of the various embodiments, increased inspection detail may be directed to one or more network flows that may be associated with particular entities or activities. In one or more of the various embodiments, actions associated with activated monitoring triggers may include capturing, inspecting, or analyzing a portion of the network traffic or network packets in a network flow. For example, if the network flow is carrying streaming video traffic, the actions for increasing inspection detail may include capturing header packers, entitlement packets, key frame packets, or the like, for increased analysis rather than capturing the entire video stream. Similarly, for example, monitoring triggers may be arranged to capture network traffic associated with queries, control commands, error messages, or the like, associated with database entities while omitting network packets that include results set data.

In one or more of the various embodiments, one or more monitoring triggers may be arranged to capture handshake information for various protocols. For example, triggers may be arranged to activate if a client may be requesting a secure session with an entity in a monitored network. In this example, the increased inspection detail may include capturing some or all of the network traffic associated with setting up the secure session (handshake information). Then, in this example, the inspection detail may be restored to normal after the secure session is established.

In one or more of the various embodiments, one or more monitoring triggers may be configured to randomly increase inspection detail for various activities or entities in the monitored network. For example, a trigger may be configured to activate based on a timer such that it increases the inspection detail for a random entity in the network for a defined period of time. Random sampling or random inspection monitoring triggers may be configured for different applications, services, user classes, users, network portions, clients, servers, or the like, or combination thereof.

In one or more of the various embodiments, monitoring triggers may be associated with monitoring engines that activate monitoring triggers or perform some or all of the actions associated with monitoring triggers. In some embodiments, some or all of the actions associated with monitoring engines may be performed by NMCs, alert engines, capture engines, or the like.

Note, in one or more of the various embodiments, in general, the time periods or specific areas of increased inspection detail may be determined based on the needs, concerns, or capabilities of a particular organization.

In one or more of the various embodiments, one or more machine learning models may be associated with one or more monitoring triggers. Also, in some embodiments, one or more machine learning models may be included in the rules or conditions associated with one or more triggers. Accordingly, the activation of one or more triggers may depend in part on classifications, scores, signals, or the like, produced based on evaluating monitored network traffic or metrics using a machine learning engine and or one or more machine learning models.

Alert Triggers

In one or more of the various embodiments, alert triggers may be associated with one or more conditions that trigger NMCs to generate one or more alerts. Similar to monitoring triggers, alert triggers may be associated with priority scores, resource costs, resource budgets, machine learning models, or the like.

Generally, in one or more of the various embodiments, activation conditions for alert triggers may be considered similar to activation conditions for monitoring triggers. Accordingly, for brevity and clarity redundant descriptions of activation conditions described elsewhere are not repeated here. However, in some embodiments, the activation actions associated with alert triggers may be directed towards providing alerts, notifications, messages, or the like, to particular users or services associated with a given alert trigger rather than directed to modifying inspection detail.

In one or more of the various embodiments, the activation actions associated with an alert trigger may include selecting or identifying the contents of an alert, selecting or employing its delivery mechanism, selecting the destination or target of the alert, or the like.

In one or more of the various embodiments, alert triggers may be associated with an alert engine that activates alert triggers or performs the actions associated with alert triggers. In some embodiments, some or all of the actions associated with alert engines may be performed by NMCs, monitoring engines, capture engines, or the like.

Figure 6:
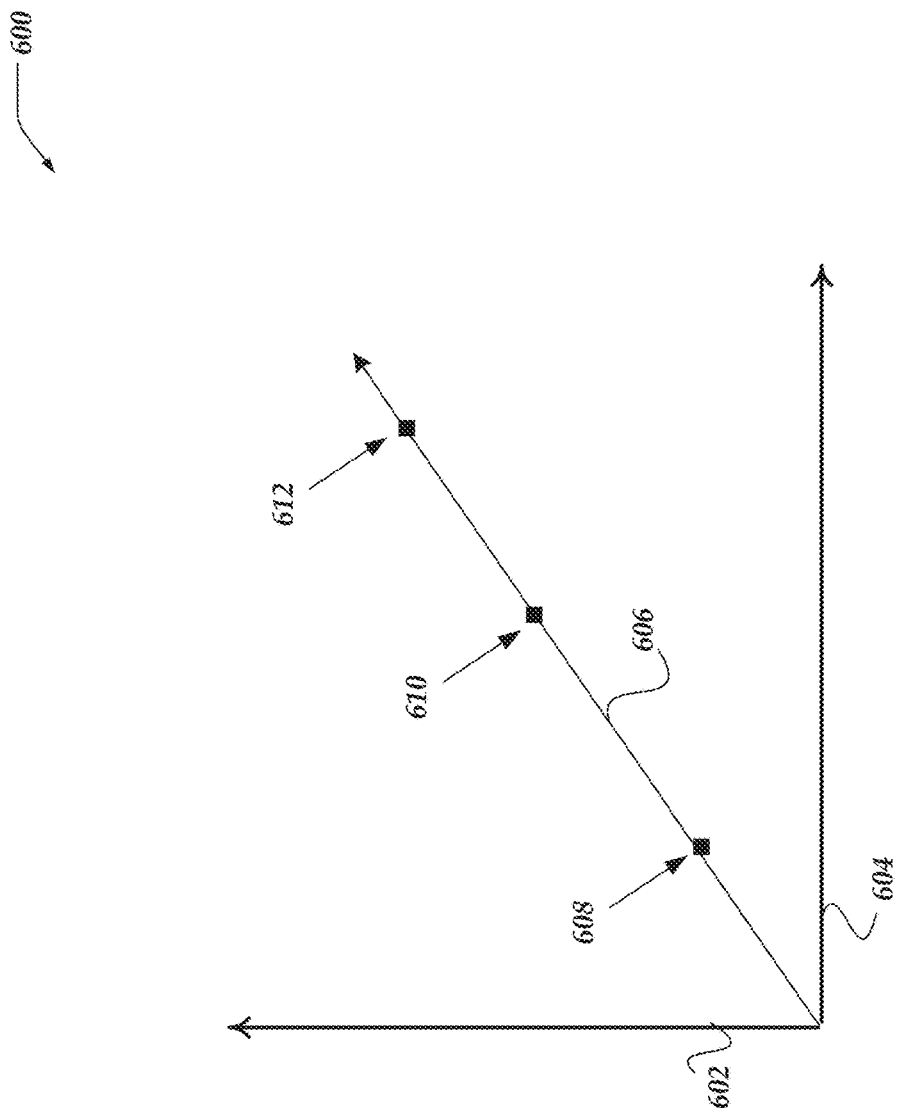
FIG. 6 illustrates a logical representation of a metric that may be associated with one or more triggers in accordance with one or more of the various embodiments.

FIG. 6 illustrates a logical representation of a metric 600 that may be associated with one or more triggers in accordance with one or more of the various embodiments. In some embodiments, NMCs may be arranged to monitor various metrics associated with the network traffic that occurs in one or more monitored networks. In this example, domain axis 602 may represent various metric values. Likewise, range axis 604 may represent various range values. For example, metric 600 may represent the number HTTP of connections over time, where axis 602 represent the number of HTTP connections and axis 604 may represent time in seconds. Accordingly, in one or more of the various embodiments, one or more points, such as, point 608, point 610, point 612 may be considered to correspond to particular metric values.

In one or more of the various embodiments, one or more activation conditions for a trigger may be associated with individual points or threshold values. Accordingly, in one or more of the various embodiments, for a given metric, if a threshold point is met, it may match one or more activation conditions associated with one or more triggers. For example, at point 608, the metric value may be of no concern. Likewise, at point 610, the metric value may be of interest but not a high priority. And, at point 612, the metric value may be considered a high priority concern causing one or more triggers to activate.

In one or more of the various embodiments, NMCs may be arranged to adapt the type, detail, or granularity of monitoring based on different metric values. Accordingly, in this example, at point 608 for a given metric, the NMC may be configured to continue unchanged, whereas, at point 612 for the same metric the NMC may be configured to perform one or more actions depending on the monitoring triggers that may be associated with the given metric.

In some embodiments, the triggers may be arranged to gradually increase the detail of monitoring as one or more step values are determined. For example, if the NMC is monitoring the number of TCP resets coming from an endpoint, one or more triggers may be configured to assume a number of resets/minute at point 608 to be of no concern. While, in this example, at point 610, one or more of the triggers may be configured activate and modify the inspection detail by executing one or more additional heuristics to analyze the network traffic associated the endpoints or entities associated with the resets. And, at point 612, the one or more alert triggers may be activated to provide one or more alerts associated with the observed TCP resets.

Further, in one or more of the various embodiments, as one or more threshold metric values are met, the NMC may be arranged to bring additional monitoring types online. For example, in some embodiments, at point 608, the NMC may be configured to receive metric values from capture agents local or closer to the monitored networks. At point 610, the one or more activated triggers may cause NMCs to capture full packets from the flows associated with the monitored metrics, so it may perform deep packet inspection and additional analysis. And, at point 612, one or more activated triggers may cause the NMC store the captured packets and generate one or more alerts.

Accordingly, in one or more of the various embodiments, the NMC may be arranged to adaptively modify the type of monitoring, frequency of monitoring, the amount of traffic that is captured, how much or what type of packets are stored, or the like, based on one or more observed metrics.

In one or more of the various embodiments, one or more monitoring triggers may be arranged to cause NMCs to communicate control signals to one or more capture agents based on collected or observed metric values. For example, at point 608, an activate monitoring trigger may cause the NMC to enable the capture agents to report aggregate metric values to the NMC rather than forwarding network traffic to the NMC. Accordingly, if the metric value reaches a point, such as point 610, an activate monitoring trigger may cause the NMC to direct the capture agents to begin forwarding network traffic associated with offending metric to the NMC for additional analysis. Thus, in some embodiments, capture agents may forward actual traffic to NMCs if one or more metrics of interest exceed a defined value rather continually consuming network resources by forwarding all or most of the network traffic to the NMC.

Note, one of ordinary skill in the art will appreciate that NMCs may be arranged to employ various metric value triggering types beyond the example shown by FIG. 6. For example, in some embodiments, various trigger types may include, edge triggers, level triggers, averaging triggers (rolling averages), absolute value triggers, comparative triggers (based on comparing differences between two or more metrics), accumulation triggers, velocity triggers (e.g., first derivatives), acceleration triggers (e.g., second derivatives), compound triggers, machine learning models, or the like, or combination thereof. Further, in one or more of the various embodiments, one or more triggers may be dependent on one or more other triggers.

Generalized Operations

FIGS. 7-10 represent generalized operations for adaptive network monitoring with tuneable elastic granularity with one or more of the various embodiments. In one or more of the various embodiments, processes 700, 800, 900, and 1000 described in conjunction with FIGS. 7-10 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers or containers, such as, those in a cloud-based environment or in containerized computing environments. However, embodiments are not so limited and various combinations of network computers, client computers, or the like may be utilized. Further, in one or more of the various embodiments, the processes described in conjunction with FIGS. 7-10 may be used for adaptive network monitoring with tuneable elastic granularity in accordance with at least one of the various embodiments and/or architectures such as those described in conjunction with FIGS. 4-6. Further, in one or more of the various embodiments, some or all of the actions performed by processes 700, 800, 900, and 1000 may be executed in part by network monitoring engine 322, capture engine 324, machine learning engine 325, analysis engine 326, or alert engine running on one or more processors of one or more network computers.

Figure 7:
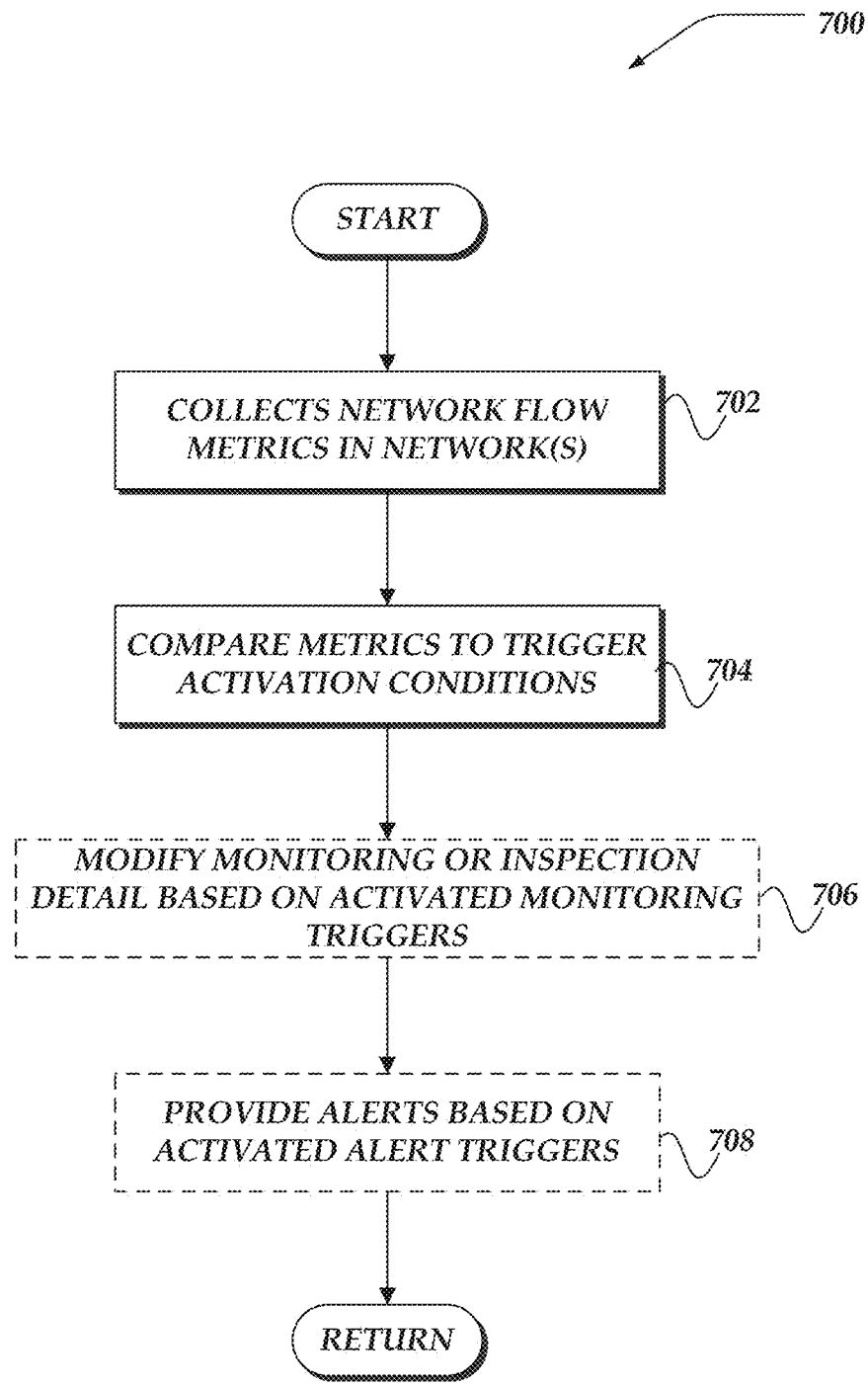
FIG. 7 illustrates an overview flowchart of a process for adaptive network monitoring with tuneable elastic granularity in accordance with one or more of the various embodiments.

FIG. 7 illustrates an overview flowchart of process 700 for adaptive network monitoring with tuneable elastic granularity in accordance with one or more of the various embodiments. After a start block, at block 702, one or more NMCs may be arranged to collect one or more network traffic metrics that may be associated with one or more network flows in one or more monitored networks. As described above, NMCs may be arranged to monitor network traffic that may be coming from one or more clients that may be trying to target one or more servers, services, applications, or the like, or combination thereof. In the interest of clarity and brevity the various targets that clients may be directing requests or other towards may be referred to simply as servers. Clearly, clients are not limited to targeting servers so one of ordinary skill in the art will appreciate that there may be types of targets, such as, applications, appliances, routers, firewalls, servers, services, name services, or the like, or combination thereof.

Further, in one or more of the various embodiments, NMCs may be arranged to collect various metrics related to the monitored network traffic, such as client send rate, server response rate, tuple information of observed network flows or network connections, or the like. Also, in one or more of the various embodiments, NMCs may monitor rates of changes, averages, totals, aggregate values, or the like. Further, in some embodiments, NMCs may be arranged to perform deep packet inspection of some or all packets sent by clients or servers. In some embodiments, NMCs may be arranged to monitor network traffic in the different OSI layers rather than being limited to monitoring OSI layer 7 (e.g., application layer).

At block 704, in one or more of the various embodiments, the NMCs may be arranged to evaluate one or more trigger activation conditions based on the one or more metrics. In one or more of the various embodiments, the conditions may be automatically associated with network flows or network traffic based on one or more characteristics of the flows or traffic. Also, in some embodiments, NMCs may be arranged to employ configuration information that maps or associates one or more characteristics to one or more triggers. For example, in one or more of the various embodiments, NMCs may be arranged to apply various triggers to HTTP traffic and other triggers to network filesystem activity. Also, in some embodiments, one or more triggers may be arranged to have hierarchal or dependencies relationships such that some triggers are applied before others may be considered. Likewise, in one or more of the various embodiments, some triggers may include branching logic that enables particular conditions or actions to be applied given the result of other conditions, actions, or triggers.

In one or more of the various embodiments, one or more machine learning models associated with a trigger may be executed by a machine learning engine to evaluate monitored network traffic, metrics, or the like. In some embodiments, such evaluation results may be used in trigger conditions. For example, in some embodiments, a trigger may be arranged to use the machine learning engine that employ a machine learning model that is trained to identify one or more malicious behaviors. Accordingly, in this example, the trigger condition may include a comparison to determine if a classification score provide by the machine learning engine exceeds a defined threshold, indicating that there may be a potential threat.

At block 706, in one or more of the various embodiments, optionally, the one or more NMCs may be arranged to instantiate one or more monitoring engines that may determine if one or more metrics or other characteristics associated with the monitored network traffic correspond to conditions required to activate one or more monitoring triggers. In some embodiments, monitoring triggers may be associated with various actions to modify the monitoring process itself. For example, as discussed above, a monitoring trigger may be defined to initiate full packet capture of a network flow that exhibits suspicious activity.

In one or more of the various embodiments, the monitoring triggers that are available or activating may be defined using rule-based policies, machine learning, configuration information, user input, or the like, or combination thereof.

This block is marked optional because it depends on the monitoring triggers and the network traffic in an actual environment. In some embodiments, if monitoring triggers are not activated monitoring actions may remain unchanged.

At block 708, in one or more of the various embodiments, optionally, the one or more NMCs may be arranged to instantiate one or more monitoring engines that may determine if one or more metrics or other characteristics associated with the monitored network traffic correspond to activation conditions of one or more alert triggers. In some embodiments, alert triggers may be arranged to provide various alerts to one or more users, agents, services, organizations, or the like, based on circumstances or scenarios discovered by the monitoring process. For example, as discussed above, an alert trigger may be defined to send alerts to designated IT personnel if a suspicious activity is detected.

In one or more of the various embodiments, the alert triggers that are available or active may be defined using rule-based policies, machine learning, configuration information, user input, or the like, or combination thereof.

This block is marked optional because it depends on the alert triggers and the network traffic in an actual environment. In some embodiments, alerts may not be provided if alert triggers are not activated. Next, control may be returned to a calling process.

Figure 8:
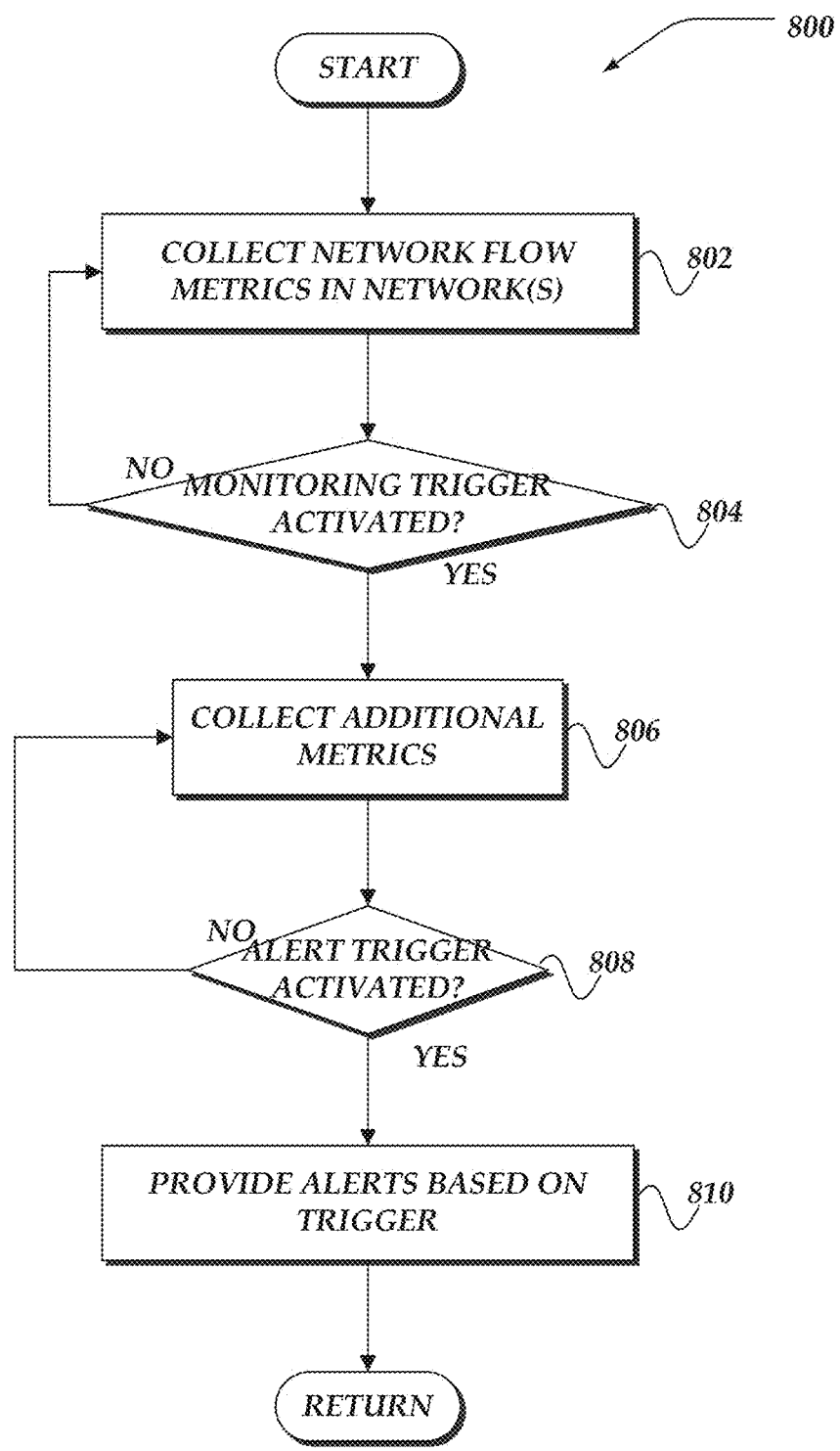
FIG. 8 illustrates a flowchart of a process for adaptive network monitoring with tuneable elastic granularity in accordance with one or more of the various embodiments.

FIG. 8 illustrates a flowchart of process 800 for adaptive network monitoring with tuneable elastic granularity in accordance with one or more of the various embodiments. After a start block, at block 802, one or more NMCs may be arranged to collect one or more network traffic metrics that may be associated with one or more network flows in one or more monitored networks. As described above, NMCs may be arranged to monitor network traffic that may be coming from one or more clients that may be trying to target one or more servers, services, applications, or the like, or combination thereof. In the interest of clarity and brevity the various targets that clients may be directing requests or other towards may be referred to simply as servers. Clearly, clients are not limited to targeting servers so one of ordinary skill in the art will appreciate that there may be many types of targets, such as, applications, appliances, routers, firewalls, servers, services, name services, or the like, or combination thereof.

Further, in one or more of the various embodiments, NMCs may be arranged to collect various metrics related to the monitored network traffic, such as client send rate, server response rate, tuple information of observed network flows or network connections, or the like. Also, in one or more of the various embodiments, NMCs may monitor rates of changes, averages, totals, aggregate values, or the like. Further, in some embodiments, NMCs may be arranged to perform deep packet inspection of some or all packets sent by clients or servers. In some embodiments, NMCs may be arranged to monitor network traffic in the different OSI layers rather than being limited to monitoring OSI layer 7 (e.g., application layer).

In one or more of the various embodiments, one or more NMCs may be arranged to instantiate one or more monitoring engines, such as, monitoring engine 322, to perform one or more of the monitoring actions.

At decision block 804, in one or more of the various embodiments, if a monitoring trigger is activated, control may flow to block 806; otherwise, control may loop back to block 802.

In one or more of the various embodiments, a monitoring engine may be arranged to adapt or modify the current network monitoring actions based on the activation actions of one or more activated monitoring triggers. In some embodiments, the modifications may be determined based on the application of one or more rule-based policies, configuration information, or the like, that may be associated with the one or more activated monitoring triggers.

In one or more of the various embodiments, one or more activation conditions associated with one or more monitoring triggers may be defined that establish various conditions that may activate monitoring triggers that cause an NMC or monitoring engine to modify the inspection detail used for monitoring one or more entities in the network.

At block 806, in one or more of the various embodiments, the NMCs may be arranged to collect one or more additional metrics. In some embodiments, one or more NMCs may be arranged to instantiate one or more monitoring engines to collect one or more additional metrics associated with the modified inspection detail.

In some embodiments, the modifications may include collecting additional metrics that may be associated with one or more OSI layers of the network traffic. For example, in some embodiments, if a metric value associated with OSI layer four of a network flow exceeds a defined threshold, it may activate a monitoring trigger that causes a monitoring engine to begin collecting additional layer 7 metrics for the same network flow. Similarly, in one or more of the various embodiments, if one or more metrics are exceeded, an activated monitoring trigger may cause the NMC to direct one or more capture agents to provide the additional metrics. Also, in some embodiments, trigger activation actions may cause the NMC to direct the one or more capture agents to capture some or all of the network packets associated with the network flows of interest and forward them to one or more NMCs or packet data stores.

In one or more of the various embodiments, rather than strictly collecting additional metrics for the one or more network flows of interest, one or more activated monitoring triggers may cause NMCs to cancel the collection of one or more metrics and start collection one or more other metrics.

Note, in some embodiments, NMCs may modify the monitoring for some or all monitored network flows. Alternatively, in some embodiments, the NMCs may be arranged to modify the monitoring for one or more network flows based on the activation actions associated with the activated triggers that initiated the modifications.

At decision block 808, in one or more of the various embodiments, if the monitoring, metrics, or additional metrics activate trigger one or more alert triggers, control may flow block 810; otherwise, control may loop back to block 802 to continue the monitoring process.

At block 810, in one or more of the various embodiments, one or more activated alert triggers may cause NMCs to provide one or more alerts according to the activation actions associated with activated alert triggers. Various alert mechanisms may be used, including but not limited to, email, user-interface based alarms, pager pages, text messages, system events, logging, API calls to other services, or the like, or combination thereof. Next, control may be returned to a calling process.

Figure 9:
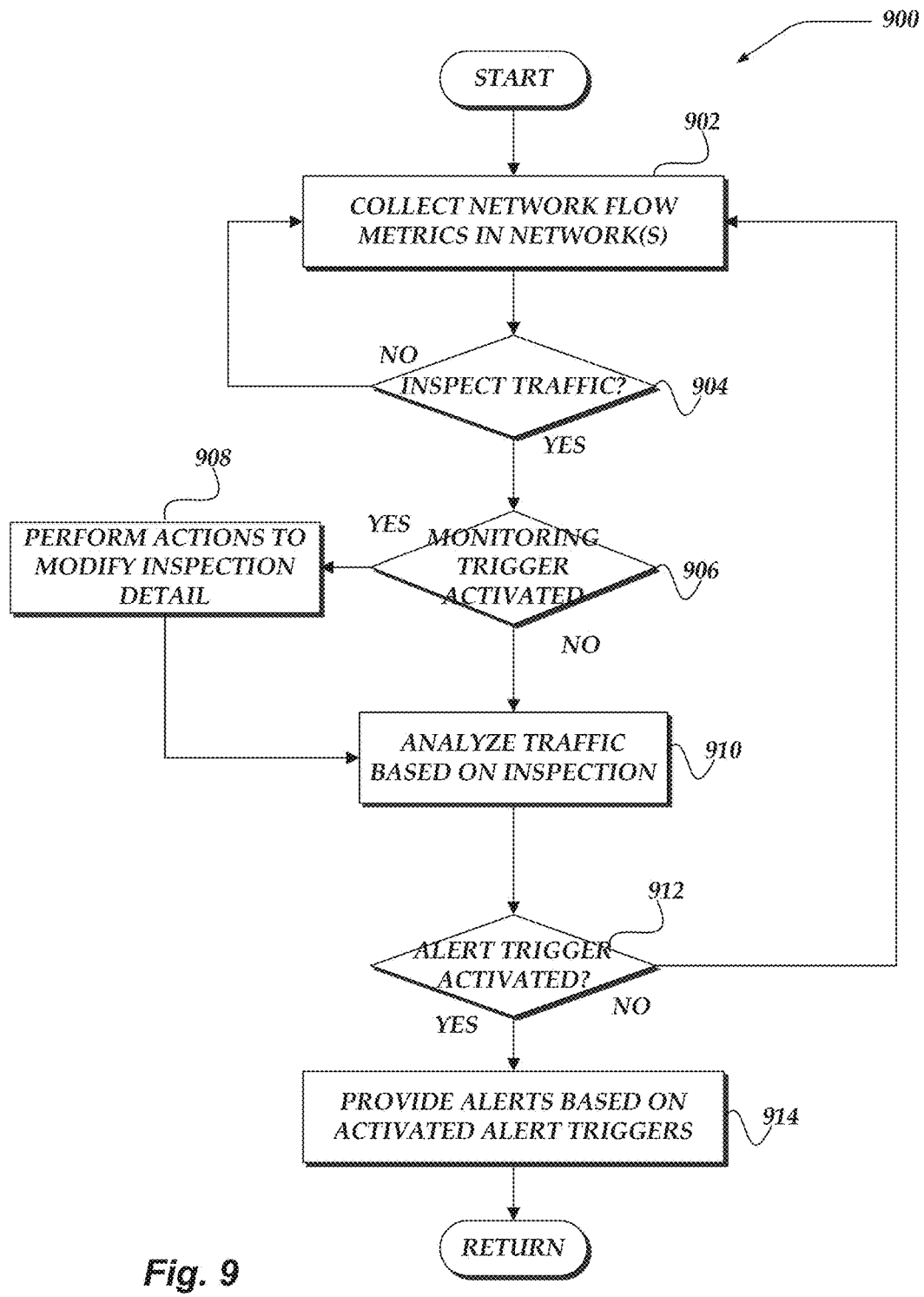
FIG. 9 illustrates a flowchart of a process for modifying inspection granularity in accordance with one or more of the various embodiments.

FIG. 9 illustrates a flowchart of process 900 for modifying inspection granularity in accordance with one or more of the various embodiments. After a start block, at block 902, in one or more of the various embodiments, one or more NMCs may be arranged to collect one or more network traffic metrics that may be associated with one or more network flows in one or more monitored networks. As described above, NMCs may be arranged to monitor network traffic that may be coming from one or more clients that may be trying to target one or more servers, services, applications, or the like, or combination thereof. In the interest of clarity and brevity the various targets that clients may be directing requests or other towards may be referred to simply as servers. Clearly, clients are not limited to targeting servers so one of ordinary skill in the art will appreciate that there may be types of targets, such as, applications, appliances, routers, firewalls, servers, services, name services, or the like, or combination thereof.

Further, in one or more of the various embodiments, NMCs may be arranged to collect various metrics related to the monitored network traffic, such as client send rate, server response rate, tuple information of observed network flows or network connections, or the like. Also, in one or more of the various embodiments, NMCs may monitor rates of changes, averages, totals, aggregate values, or the like. Further, in some embodiments, NMCs may be arranged to perform deep packet inspection of some or all packets sent by clients or servers. In some embodiments, NMCs may be arranged to monitor network traffic in the different OSI layers rather than being limited to monitoring OSI layer 7 (e.g., application layer).

In one or more of the various embodiments, one or more NMCs may be arranged to instantiate one or more monitoring engines, such as, monitoring engine 322, to perform one or more of the monitoring actions.

At decision block 904, in one or more of the various embodiments, if the one or more NMCs determines that some or all of the traffic requires inspection, control may flow to decision block 906; otherwise, control may loop back to block 902. In one or more of the various embodiments, NMCs may instantiate one or more monitoring engines to determine if some or all of the network traffic associated with one or more metrics should be inspected.

In one or more of the various embodiments, one or more metrics may be collected with little or no inspection of the contents of network packets associated with monitored network flows. in one or more of the various embodiments, monitoring engines may be arranged to collect one or more metrics based on protocol header information (e.g., tuple information) rather than inspecting deeper into the contents of the network packets.

However, in one or more of the various embodiments, one or more monitoring triggers may be arranged to initiate additional or deeper inspection of the network packets if one or more activation conditions are met. For example, in some embodiments, a monitoring trigger may be arranged to initiate packet inspection if the number of TCP RESETs per minute exceeds a defined threshold.

Accordingly, in one or more of the various embodiments, NMCs may perform low-impact inspection or analysis of network traffic unless one or more conditions are met. If one or more monitoring triggers are activated they may cause the monitoring engines (including remote monitoring engines that may be associated with one or more capture agents) to perform additional actions to the increase or decrease inspection detail for network traffic that is associated with one or more entities in the monitored networks.

At decision block 906, in one or more of the various embodiments, if the one or more monitoring triggers are activated, control may flow to block 908; otherwise, control may flow block 910. In one or more of the various embodiments, NMCs may be arranged to instantiate one or more monitoring engines to analyze the inspected network traffic. Accordingly, in one or more of the various embodiments, the metrics or traffic characteristics associated with the monitored traffic may activate one or more monitoring triggers that may be arranged to perform actions that modify or adapt the current inspection detail or granularity. In some embodiments, some monitoring triggers may cause inspection detail to increase, whereas others may decrease the inspection detail.

In one or more of the various embodiments, particular monitoring triggers may be arranged to modify inspection detail on a per flow basis. Also, in one or more of the various embodiments, one or more monitoring triggers may be arranged to modify inspection detail for entire source networks, source sub-networks, destination networks, destination sub-networks, application types, device types, transport protocol types, or the like, or combination thereof.

At block 908, in one or more of the various embodiments, the one or more NMCs may be arranged to modify the inspection detail based on the activation actions associated with one or more activated monitoring triggers. In one or more of the various embodiments, the one or more monitoring triggers activated at decision block 906, may be associated with one or more actions for modifying the current inspection detail. In one or more of the various embodiments, the actions may be defined by rule-based policies, configuration information, scripts, built-in, programs, plug-ins, or the like.

In one or more of the various embodiments, modifications to inspection detail may include increasing the amount of packet data collected by NMCs, monitoring engine, or capture engines. For example, in some embodiments, if one or more anomalies associated with network traffic directed towards an important file server activates one or more monitoring triggers, their actions may be arranged to initiate full packet capture of one or more network flows associated with the important file server. Accordingly, in this example, increasing the inspection detail includes capturing all of the traffic data for the network flows of interest. Whereas, in some embodiments, the inspection detail for other network flows may remain unchanged. Thus, in one or more of the various embodiments, the monitoring engine may perform expensive deep packet inspection or packet capturing that may be limited to the network flows that have activated the monitoring trigger.

Likewise, in one or more of the various embodiments, one or more monitoring triggers may be arranged to reduce inspection detail for one or more network flows. For example, in some embodiments, if one or more network flows being closely inspected are determined to be safe or otherwise of no concern, the monitoring engine may be arranged to reduce inspection detail for those network flows. Accordingly, in one or more of the various embodiments, the NMC may automatically increase inspection detail for one or more network flows of interest and then automatically decrease the inspection detail for those same one or more network flows if they are determined safe or of no concern.

At block 910, in one or more of the various embodiments, the one or more NMCs may be arranged to analyze the network traffic based on the current inspection detail. In one or more of the various embodiments, the one or more NMCs may be arranged to instantiate one or more monitoring engines to perform actions to analyze the network traffic. In some embodiments, this analysis may include providing metrics, captured network traffic, or the like, to an analysis engine. In some embodiments, analysis may include comparing one or more metrics or traffic characteristics to activation conditions to one or more monitoring triggers or alert triggers. Accordingly, in one or more of the various embodiments, results determined during analysis at block 910 may activate one or more monitoring triggers that further modify inspection detail.

At decision block 912, in one or more of the various embodiments, if one or more alerts triggers are activated, control may flow block 914; otherwise, control may loop back to block 902 to continue the monitoring process. In one or more of the various embodiments, the one or more NMCs may determine that one or more alert triggers should be activated. Similar to analyzing traffic or metrics to determine which monitoring triggers to activate, the NMCs may be arranged to analyze traffic or metrics to determine which alert triggers to activate, if any.

At block 914, in one or more of the various embodiments, the NMCs may be arranged to provide one or more alerts based on the activated alert triggers. Various alert mechanisms may be used, including but not limited to, email, user-interface based alarms, pages, text messages, system events, logging, API calls to other services, or the like, or combination thereof. Next, control may be returned to a calling process.

Figure 10:
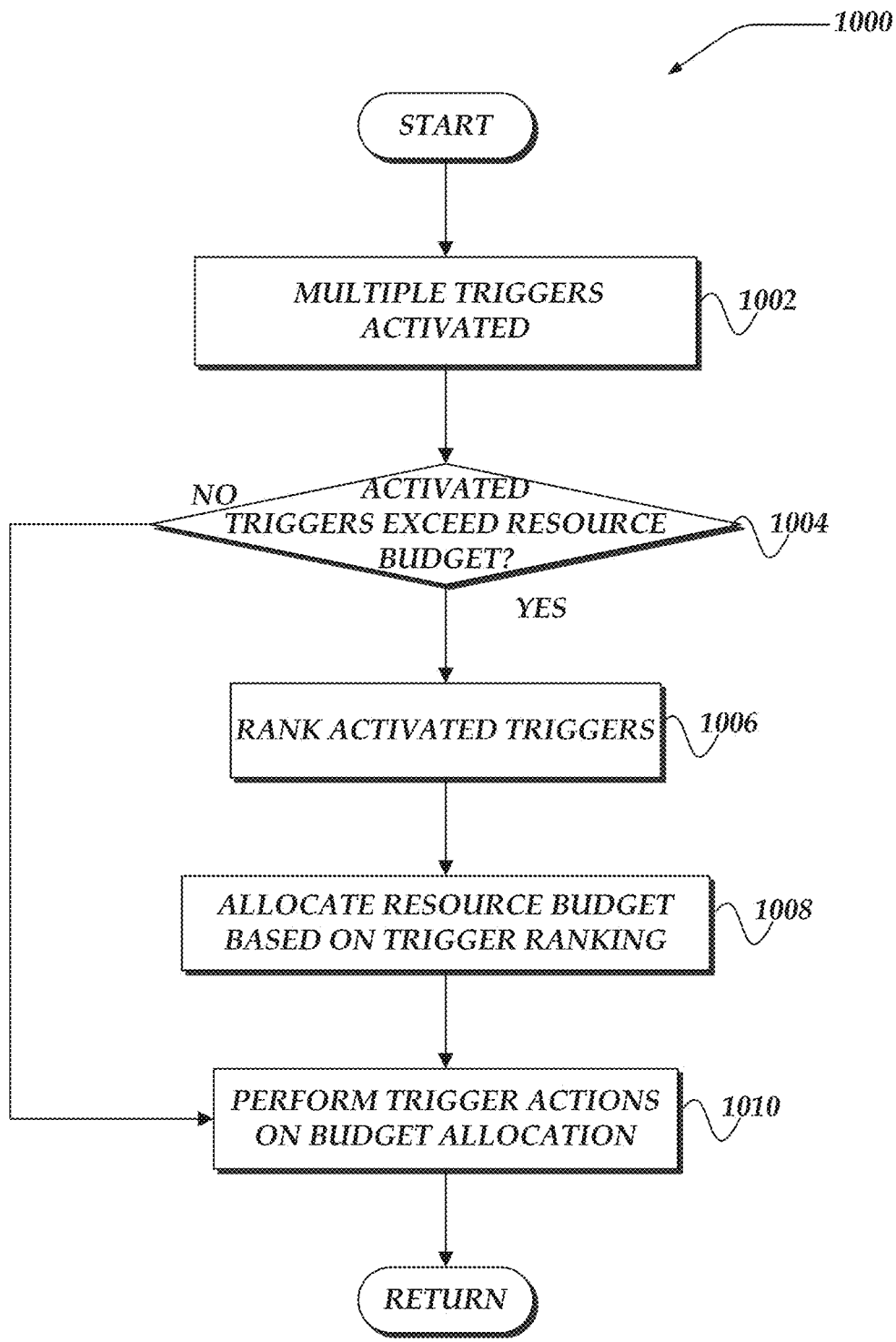
FIG. 10 illustrates a flowchart of a process for modifying inspection granularity in accordance with one or more of the various embodiments.

FIG. 10 illustrates a flowchart of process 1000 for modifying inspection granularity in accordance with one or more of the various embodiments. After a start block, at block 1002, in one or more of the various embodiments, activation conditions for two or more triggers (monitoring triggers or alert triggers) may be met. In one or more of the various embodiments, metrics or traffic characteristics discovered by a monitoring engine or analysis engine may activate multiple triggers. In some embodiments, the same activation conditions may be associated with more than one trigger.

In one or more of the various embodiments, one or more anomalies may cause the activation of multiple triggers. In some embodiments, malicious traffic on a network flow may activate a trigger associated with the specific attack, as well as, one or more triggers associated affected applications, services, other devices, or the like. For example, a DDOS attack directed at database server may activate a general DDOS detect trigger, one or more database fail triggers, one or more service fail triggers (associated with services that are failing because they cannot access the database), hundreds of web server error triggers, network utilization triggers, or the like, or combination thereof. In one or more of the various embodiments, this may cause a cascade of activated triggers that may overwhelm or otherwise negatively impact the performance of the NMC or the network environment in general.

Accordingly, in one or more of the various embodiments, the NMCs may be arranged associate a priority score and a cost score with some or all triggers. The priority score may be used to rank order the triggers and the cost score may be used to determine how many activated triggers may be allowed to perform activation actions. In one or more of the various embodiments, alert triggers and monitoring triggers may be prioritized or costed independently.

At decision block 1004, in one or more of the various embodiments, if the costs associated with the activated triggers exceed their associated resource budget, control may flow to block 1006; control may flow to block 1010. If perform the activation actions associated with the one or more triggers exceeds the resource budget associated with the one or more activated triggers, NMCs may be arranged to perform further actions to allocate the resource budget among the one or more activated triggers. Note, in some embodiments, there may be more than one resource budget associated different types of triggers. In some embodiments, alert triggers may be associated with resource budgets that may be separate from resource budgets associated with monitoring triggers. Likewise, in some embodiments, one or more types or classes of triggers may be associated separate resource budgets. Further, in some embodiments, some triggers may be unassociated with resource budgets. For example, some triggers may be considered so important that they should always perform their associated actions if they are activated. Also, in some embodiments, some triggers may have such a low resource impact that their associated actions may always be performed irrespective of resource budgets.

At block 1006, in one or more of the various embodiments, the one or more NMCs may be arranged to rank the activated triggers based on their priority scores. In one or more of the various embodiments, triggers may be associated with a priority score that enables the one or more NMCs to rank order the one or more activated triggers. In one or more of the various embodiments, activated triggers that are associated with the same resource budget may be ranked independent of other activated triggers that may be associated with other resource budgets.

In one or more of the various embodiments, one or more machine learning engines may be instantiated to rank the activated triggers or to modify or adjust the priority scores used for ranking triggers. Accordingly, in some embodiments, machine learning engines may be arranged to evaluate one or more machine learning models to increase or decrease priority scores or otherwise modify the ranking to the activated triggers.

At block 1008, in one or more of the various embodiments, the one or more NMCs may be arranged to allocate resource budget to activated triggers based on the available resource budget and priority rank order and cost of the activated triggers. In some embodiments, the highest priority triggers may be allocated resource budget before lower priority triggers. Accordingly, in some embodiments, some triggers may not be activated if the resource budget is consumed by other higher priority triggers.

In one or more of the various embodiments, NMCs may be arranged to monitor how long one or more triggers may have been delayed or deferred because of a lack of resource budget. Accordingly, in one or more of the various embodiments, one or more triggers may be configured to have a maximum delay time or maximum number sequential of deferrals that if exceeded temporarily increases their priority score. Thus, in some embodiments, some activated triggers that may otherwise be indefinitely delayed or deferred may be allowed to perform their actions if they are delayed too long or deferred too often. In some embodiments, individual triggers, categories of triggers, or the like, may be associated with dedicated or customized priority score escalation rules. Further, in some cases, one or more triggers may be unassociated with a priority escalation rule. These triggers may be indefinitely excluded from activating unless there is resource budget available.

In one or more of the various embodiments, one or more machine learning engines may be instantiated to modify or adjust the allocation of the resources or resource budgets. Accordingly, in some embodiments, machine learning engines may be arranged to evaluate one or more machine learning models to allocate some or all of the monitoring or triggering resources or otherwise modify the allocation resources to activated triggers.

At block 1010, in one or more of the various embodiments, the one or more NMCs may be arranged to perform the activation actions for the one or more activated triggers that are allocated resource budget. Also, in one or more of the various embodiments, the one or more NMCs may be arranged to deactivate one or more activated triggers that are not allocated resource budget. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for monitoring network traffic using one or more network computers, wherein execution of instructions by the one or more network computers perform the method comprising:
 instantiating a monitoring engine to perform actions, including:
 providing one or more monitoring triggers, wherein each monitoring trigger is associated with one or more conditions and one or more actions;
 monitoring information that is associated with network traffic associated with one or more networks based on an inspection detail level;
 comparing the monitored information to the one or more conditions associated with the one or more monitoring triggers;
 adaptively activating one or more of the one or more monitoring triggers based on a result of the comparison; and
 modifying the inspection detail level based on the one or more actions associated with the one or more activated monitoring triggers and an available amount of one or more of compute, data storage or network resources, wherein the modification of the inspection detail level initiates or stops deep packet detail level inspection of packets captured in an amount of the monitored information for the one or more activated monitoring triggers provided by the monitoring engine; and
 instantiating an analysis engine to perform actions, including, providing analysis of the network traffic based on the inspected packets of the amount of monitored information.

2. The method of claim 1, wherein comparing the monitored information to the one or more conditions associated with the one or more monitoring triggers, further comprises, instantiating a machine learning engine to evaluate the monitored information based on one or more machine learning models, wherein a result of the evaluation is included in the comparison.

3. The method of claim 1, further comprising, instantiating an alert engine to perform actions, including:
providing one or more alert triggers, wherein each alert trigger is associated with one or more conditions and one or more actions;
activating one or more of the one or more alert triggers based on the result of the comparison between the information to the one or more conditions associated with the one or more alert triggers; and
providing one or more alerts based on the one or more activated alert triggers.

4. The method of claim 1, wherein the monitoring engine performs actions further comprising:
providing a resource budget that is associated with the one or more networks and the one or more activated monitoring triggers; and
when a total resource cost associated with the one or more activated monitoring triggers exceeds the resource budget, allocating a portion of the resource budget to one or more of the one or more activated monitoring triggers based on one or more of one or more priority scores that are associated with each of the one or more monitoring triggers, or one or more machine learning evaluations performed by a machine learning engine.

5. The method of claim 1, wherein the monitoring engine performs actions further comprising:
providing a resource budget that is associated with the one or more networks and the one or more activated monitoring triggers, wherein the portion of the resource budget that is allocated to the one or more of the one or more monitoring triggers is based on a resource cost that is associated with each of the one or more monitoring triggers; and
de-activating a remainder of the one or more activated monitoring triggers that are excluded, wherein allocating the resource cost associated with each deactivated monitoring trigger to the resource budget exceeds the resource budget.

6. The method of claim 1, wherein increasing the amount of the information monitored by the monitoring engine, further comprises performing one or more of: collecting more data, collecting different data, collecting data for additional agents, capturing network packets, or capturing increased portions of network packets.

7. The method of claim 1, wherein the actions of the one or more activated monitoring triggers further comprise increasing the inspection detail based on one or more occurrences of a file access event, wherein additional information is analyzed to determine whether the one or more occurrences of file access event is a malicious attack on a file server.

8. The method of claim 1, wherein the actions of the one or more activated monitoring triggers further comprising:
identifying monitored information that is associated with an application; and
when a behavior of a user in communication with the application matches one or more of behavior corresponding to a malicious state machine, or behavior classified as malicious by a machine learning engine, increasing the inspection detail.

9. A processor readable non-transitory storage media that includes instructions for monitoring network traffic using one or more network monitoring computers, wherein execution of the instructions by the one or more network computers perform the method comprising:
instantiating a monitoring engine to perform actions, including:
providing one or more monitoring triggers, wherein each monitoring trigger is associated with one or more conditions and one or more actions;
monitoring information that is associated with network traffic that is associated with one or more networks based on an inspection detail level;
comparing the monitored information to the one or more conditions associated with the one or more monitoring triggers;
adaptively activating one or more of the one or more monitoring triggers based on a result of the comparison; and
modifying the inspection detail level based on the one or more actions associated with the one or more activated monitoring triggers and an available amount of one or more of compute, data storage or network resources, wherein the modification of the inspection detail level initiates or stops deep packet detail level inspection of packets captured in an amount of the monitored information for the one or more activated monitoring triggers provided by the monitoring engine.

10. The media of claim 9, wherein comparing the monitored information to the one or more conditions associated with the one or more monitoring triggers, further comprises, instantiating a machine learning engine to evaluate the monitored information based on one or more machine learning models, wherein a result of the evaluation is included in the comparison.

11. The media of claim 9, further comprising:
instantiating an alert engine to perform actions, including:
providing one or more alert triggers, wherein each alert trigger is associated with one or more conditions and one or more actions;
activating one or more of the one or more alert triggers based on the result of the comparison between the information to the one or more conditions associated with the one or more alert triggers; and
providing one or more alerts based on the one or more activated alert triggers.

12. The media of claim 9, wherein the monitoring engine performs actions further comprising:
providing a resource budget that is associated with the one or more networks and the one or more activated monitoring triggers; and
when a total resource cost associated with the one or more activated monitoring triggers exceeds the resource budget, allocating a portion of the resource budget to one or more of the one or more activated monitoring triggers based on one or more of one or more priority scores that are associated with each of the one or more monitoring triggers, or one or more machine learning evaluations performed by a machine learning engine.

13. The media of claim 9, wherein the monitoring engine performs actions further comprising:
providing a resource budget that is associated with the one or more networks and the one or more activated monitoring triggers, wherein the portion of the resource budget that is allocated to the one or more of the one or more monitoring triggers is based on a resource cost that is associated with each of the one or more monitoring triggers; and
de-activating a remainder of the one or more activated monitoring triggers that are excluded, wherein allocating the resource cost associated with each deactivated monitoring trigger to the resource budget exceeds the resource budget.

14. The media of claim 9, wherein increasing the amount of the information monitored by the monitoring engine, further comprises performing one or more of: collecting more data, collecting different data, collecting data for additional agents, capturing network packets, or capturing increased portions of network packets.

15. The media of claim 9, wherein the actions of the one or more activated monitoring triggers further comprise increasing the inspection detail based on one or more occurrences of a file access event, wherein additional information is analyzed to determine whether the one or more occurrences of file access event is a malicious attack on a file server.

16. The media of claim 9, wherein the actions of the one or more activated monitoring triggers further comprising:
identifying monitored information that is associated with an application; and
when a behavior of a user in communication with the application matches one or more of behavior corresponding to a malicious state machine, or behavior classified as malicious by a machine learning engine, increasing the inspection detail.

17. A system for monitoring network traffic in a network: one or more network computers, comprising:
a transceiver that communicates over the network;
a memory that stores at least instructions; and
one or more processors that execute instructions that perform actions, including:
instantiating a monitoring engine to perform actions, including:
providing one or more monitoring triggers, wherein each monitoring trigger is associated with one or more conditions and one or more actions;
monitoring information that is associated with network traffic that is associated with one or more networks based on an inspection detail level;
comparing the monitored information to the one or more conditions associated with the one or more monitoring triggers;
adaptively activating one or more of the one or more monitoring triggers based on a result of the comparison; and
modifying the inspection detail level based on the one or more actions associated with the one or more activated monitoring triggers and an available amount of one or more of compute, data storage or network resources, wherein the modification of the inspection detail level initiates or stops deep packet detail level inspection of packets captured in an amount of the monitored information for the one or more activated monitoring triggers provided by the monitoring engine; and
instantiating an analysis engine to perform actions, including, providing analysis of the network traffic based on the inspected packets of the amount of monitored information; and
one or more client computers, comprising:
a transceiver that communicates over the network;
a memory that stores at least instructions; and
one or more processors that execute instructions that perform actions, including:
providing one or more portions of the network traffic.

18. The system of claim 17, wherein comparing the monitored information to the one or more conditions associated with the one or more monitoring triggers, further comprises, instantiating a machine learning engine to evaluate the monitored information based on one or more machine learning models, wherein a result of the evaluation is included in the comparison.

19. The system of claim 17, further comprising, instantiating an alert engine to perform actions, including:
providing one or more alert triggers, wherein each alert trigger is associated with one or more conditions and one or more actions;
activating one or more of the one or more alert triggers based on the result of the comparison between the information to the one or more conditions associated with the one or more alert triggers; and
providing one or more alerts based on the one or more activated alert triggers.

20. The system of claim 17, wherein the monitoring engine performs actions further comprising:
providing a resource budget that is associated with the one or more networks and the one or more activated monitoring triggers; and
when a total resource cost associated with the one or more activated monitoring triggers exceeds the resource budget, allocating a portion of the resource budget to one or more of the one or more activated monitoring triggers based on one or more of one or more priority scores that are associated with each of the one or more monitoring triggers, or one or more machine learning evaluations performed by a machine learning engine.

21. The system of claim 17, wherein the monitoring engine performs actions further comprising:
providing a resource budget that is associated with the one or more networks and the one or more activated monitoring triggers, wherein the portion of the resource budget that is allocated to the one or more of the one or more monitoring triggers is based on a resource cost that is associated with each of the one or more monitoring triggers; and
de-activating a remainder of the one or more activated monitoring triggers that are excluded, wherein allocating the resource cost associated with each deactivated monitoring trigger to the resource budget exceeds the resource budget.

22. The system of claim 17, wherein increasing the amount of the information monitored by the monitoring engine, further comprises performing one or more of: collecting more data, collecting different data, collecting data for additional agents, capturing network packets, or capturing increased portions of network packets.

23. The system of claim 17, wherein the actions of the one or more activated monitoring triggers further comprise increasing the inspection detail based on one or more occurrences of a file access event, wherein additional information is analyzed to determine whether the one or more occurrences of file access event is a malicious attack on a file server.

24. A network computer for monitoring communication over a network between two or more computers, comprising:
a transceiver that communicates over the network;
a memory that stores at least instructions; and
one or more processors that execute instructions that perform actions, including:

instantiating a monitoring engine to perform actions, including:
providing one or more monitoring triggers, wherein each monitoring trigger is associated with one or more conditions and one or more actions;
  monitoring information that is associated with network traffic that is associated with one or more networks based on an inspection detail level;
  comparing the monitored information to the one or more conditions associated with the one or more monitoring triggers;
  adaptively activating one or more of the one or more monitoring triggers based on a result of the comparison; and
  modifying the inspection detail level based on the one or more actions associated with the one or more activated monitoring triggers and an available amount of one or more of compute, data storage or network resources, wherein the modification of the inspection detail level initiates or stops deep packet detail level inspection of packets captured in an amount of the monitored information for the one or more activated monitoring triggers provided by the monitoring engine; and
    instantiating an analysis engine to perform actions, including, providing analysis of the network traffic based on the inspected packets of the amount of monitored information.

25. The network computer of claim 24, wherein comparing the monitored information to the one or more conditions associated with the one or more monitoring triggers, further comprises, instantiating a machine learning engine to evaluate the monitored information based on one or more machine learning models, wherein a result of the evaluation is included in the comparison.

26. The network computer of claim 24, further comprising, instantiating an alert engine to perform actions, including:
  providing one or more alert triggers, wherein each alert trigger is associated with one or more conditions and one or more actions;
  activating one or more of the one or more alert triggers based on the result of the comparison between the information to the one or more conditions associated with the one or more alert triggers; and
  providing one or more alerts based on the one or more activated alert triggers.

27. The network computer of claim 24, wherein the monitoring engine performs actions further comprising:
  providing a resource budget that is associated with the one or more networks and the one or more activated monitoring triggers; and
  when a total resource cost associated with the one or more activated monitoring triggers exceeds the resource budget, allocating a portion of the resource budget to one or more of the one or more activated monitoring triggers based on one or more of one or more priority scores that are associated with each of the one or more monitoring triggers, or one or more machine learning evaluations performed by a machine learning engine.

28. The network computer of claim 24, wherein the monitoring engine performs actions further comprising:
  providing a resource budget that is associated with the one or more networks and the one or more activated monitoring triggers, wherein the portion of the resource budget that is allocated to the one or more of the one or more monitoring triggers is based on a resource cost that is associated with each of the one or more monitoring triggers; and
  de-activating a remainder of the one or more activated monitoring triggers that are excluded, wherein allocating the resource cost associated with each deactivated monitoring trigger to the resource budget exceeds the resource budget.

29. The network computer of claim 24, wherein increasing the amount of the information monitored by the monitoring engine, further comprises performing one or more of: collecting more data, collecting different data, collecting data for additional agents, capturing network packets, or capturing increased portions of network packets.

30. The network computer of claim 24, wherein the actions of the one or more activated monitoring triggers further comprising:
  identifying monitored information that is associated with an application; and
  when a behavior of a user in communication with the application matches one or more of behavior corresponding to a malicious state machine, or behavior classified as malicious by a machine learning engine, increasing the inspection detail.

* * * * *